United States Patent
Onuma

(10) Patent No.: US 12,030,413 B2
(45) Date of Patent: Jul. 9, 2024

(54) CONVEYANCE SEAT

(71) Applicant: TS TECH CO., LTD., Saitama (JP)

(72) Inventor: Koji Onuma, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/084,603

(22) Filed: Dec. 20, 2022

(65) Prior Publication Data

US 2023/0122712 A1     Apr. 20, 2023

Related U.S. Application Data

(63) Continuation of application No. 17/314,124, filed on May 7, 2021, now Pat. No. 11,590,866, which is a
(Continued)

(30) Foreign Application Priority Data

Mar. 27, 2017 (JP) .................. 2017-061675
Mar. 27, 2017 (JP) .................. 2017-061676

(51) Int. Cl.
*B60N 2/68* (2006.01)
*B60N 2/64* (2006.01)
(Continued)

(52) U.S. Cl.
CPC ............... *B60N 2/64* (2013.01); *B60N 2/68* (2013.01); *A47C 7/40* (2013.01); *B23K 26/21* (2015.10);
(Continued)

(58) Field of Classification Search
CPC ...................................................... B60N 2/68
See application file for complete search history.

(56) References Cited

U.S. PATENT DOCUMENTS 7,066,552 B2    6/2006   Yoshida
7,905,550 B2    3/2011   Weber et al.
(Continued)

FOREIGN PATENT DOCUMENTS

CN        104972939 A      10/2015
DE    102011114546 A1       1/2013
(Continued)

OTHER PUBLICATIONS

International Search Report mailed on Nov. 21, 2017 for the corresponding International application No. PCT/JP2017/035156, with English translation.
(Continued)

*Primary Examiner* — Kyle A Cook
(74) *Attorney, Agent, or Firm* — Michael Best & Friedrich LLP

(57) ABSTRACT

Rigidity is improved at a part where side frame pieces overlap each other in a side frame. In a vehicle seat provided with a seat back frame, a side frame of the seat back frame has a first side frame piece and a second side frame piece partially overlapping each other in a direction of extension of the side frame. The side frame has an overlapping part where both the first side frame piece and the second side frame piece overlap each other. At the overlapping part, the side frame pieces overlap each other in a state where a plurality of closed regions and closed by being surrounded by both side frame pieces are formed in a cross section of the overlapping part intersecting with the direction of extension of the side frame.

10 Claims, 16 Drawing Sheets

Related U.S. Application Data continuation of application No. 16/498,698, filed as application No. PCT/JP2017/035156 on Sep. 28, 2017, now Pat. No. 11,001,178.

(51) Int. Cl.

| | | |
|---|---|---|
| A47C 7/40 | (2006.01) | |
| B23K 26/21 | (2014.01) | |
| B23K 101/00 | (2006.01) | |
| B60N 2/22 | (2006.01) | |
| B60N 2/897 | (2018.01) | |

(52) U.S. Cl.
CPC ...... *B23K 2101/006* (2018.08); *B60N 2/2222* (2013.01); *B60N 2/897* (2018.02)

(56) References Cited

U.S. PATENT DOCUMENTS

| | | |
|---|---|---|
| 8,523,284 B2 | 9/2013 | Yamada et al. |
| 8,714,654 B2 | 5/2014 | Nitsuma |
| 8,888,176 B2 | 11/2014 | Kaku et al. |
| 8,888,177 B2 | 11/2014 | Kaku et al. |
| 9,381,884 B2 | 7/2016 | Stone et al. |
| 9,889,780 B2 | 2/2018 | Tanabe et al. |
| 11,001,178 B2 | 5/2021 | Onuma |
| 2005/0200184 A1 | 9/2005 | Siegrist et al. |
| 2008/0164743 A1 | 7/2008 | Jacques et al. |
| 2009/0152929 A1 | 6/2009 | Sung et al. |
| 2009/0289491 A1 | 11/2009 | Nakagaki et al. |
| 2010/0187886 A1 | 7/2010 | Yamada et al. |
| 2013/0106153 A1 | 5/2013 | Kaku |
| 2013/0113243 A1 | 5/2013 | Kaku et al. |
| 2013/0113244 A1 | 5/2013 | Kaku et al. |
| 2013/0113245 A1 | 5/2013 | Kaku et al. |
| 2013/0113246 A1 | 5/2013 | Kaku |
| 2013/0140868 A1 | 6/2013 | Muck et al. |
| 2015/0076885 A1 | 3/2015 | Stone et al. |
| 2015/0108788 A1 | 4/2015 | Ikeda et al. |
| 2015/0123434 A1 | 5/2015 | Ikeda et al. |
| 2015/0175044 A1 | 6/2015 | Akutsu et al. |
| 2015/0197174 A1 | 7/2015 | Akutsu et al. |
| 2015/0210196 A1 | 7/2015 | Yamamoto et al. |
| 2015/0246627 A1 | 9/2015 | Shimizu et al. |
| 2015/0283970 A1 | 10/2015 | Line et al. |
| 2015/0291072 A1 | 10/2015 | Ito et al. |
| 2015/0307005 A1 | 10/2015 | Dill et al. |
| 2015/0336490 A1 | 11/2015 | Nie et al. |
| 2015/0352982 A1 | 12/2015 | Watanabe |
| 2017/0057022 A1 | 3/2017 | Yamamoto et al. |
| 2017/0341622 A1* | 11/2017 | Mizobata ............... B60N 2/897 |

FOREIGN PATENT DOCUMENTS

| | | |
|---|---|---|
| JP | 2014-129006 A | 7/2014 |
| JP | 2014-189061 A | 10/2014 |
| JP | 2015-044459 A | 3/2015 |
| JP | 2015-101285 A | 6/2015 |
| JP | 2015-140089 A | 8/2015 |
| JP | 2016-074299 A | 5/2016 |
| WO | 2009/066533 A1 | 5/2009 |
| WO | 2015/016351 A1 | 2/2015 |
| WO | 2015/129824 A1 | 9/2015 |
| WO | 2016/021554 A1 | 2/2016 |

OTHER PUBLICATIONS

Japanese Office Action mailed on May 12, 2020 for the corresponding Japanese Patent Application No. 2019-152026, with English machine translation.

Japanese Office Action mailed on Feb. 2, 2021 for the corresponding Japanese Patent Application No. 2019-152026, with English machine translation.

Chinese Office Action dated May 25, 2021 for the corresponding Chinese Patent Application No. 201780088833.X, with English machine translation.

Chinese Office Action dated Jan. 11, 2022, from the China National Intellectual Property Administration (CNIPA), for the corresponding Chinese Patent Application No. 201780088833.X, with English machine translation.

* cited by examiner

CONVEYANCE SEAT

CROSS-REFERENCE TO RELATED APPLICATIONS

This application is a continuation of U.S. patent application Ser. No. 17/314,124 filed on May 7, 2021, which, in turn, is a continuation of U.S. patent application Ser. No. 16/498,698, filed on Sep. 27, 2019, which, in turn, is a National Stage Entry of International Application No. PCT/JP2017/035156, filed on Sep. 28, 2017. Further, this application claims priority from Japanese Patent Application No. 2017-061675, filed on Mar. 27, 2017, and Japanese Patent Application No. 2017-061676, filed on Mar. 27, 2017, the entire contents of which are hereby incorporated by reference into this application.

TECHNICAL FIELD

The present invention relates to a conveyance seat in which a frame is provided and, particularly, to a conveyance seat in which a side frame positioned in a side end portion of a frame is configured by a plurality of side frame pieces overlapping each other.

BACKGROUND ART

In some conveyance seats provided with an inner frame, a side frame positioned in a side end portion of the frame is configured by a plurality of side frame pieces overlapping each other (see, for example, PATENT LITERATURE 1). In the seat device that is described in PATENT LITERATURE 1, the side frame of a seat back frame is divided into one upper frame piece and one lower frame piece and the upper and lower frame pieces partially overlap each other.

In a case where the plurality of side frame pieces constitute the side frame, an easy change in seat size is possible by the size of one of the side frame pieces being unified between products and the sizes of the remaining side frame pieces being changed between products. In other words, a flexible response to seat size variations is possible by the plurality of side frame pieces constituting the side frame.

CITATION LIST

Patent Literature

PATENT LITERATURE 1: JP 2014-129006 A

SUMMARY OF INVENTION

Technical Problem

Although the side frame pieces partially overlap each other in the side frame constituted by the plurality of side frame pieces, it is necessary to ensure sufficient rigidity as for the part where the side frame pieces overlap each other.

In this regard, the present invention has been made in view of the above problem, and an object thereof is to provide a conveyance seat in which rigidity is ensured at a side frame part where side frame pieces overlap each other.

Solution to Problem

The above object is achieved by means of the conveyance seat of the present invention in which a frame is provided. A side frame positioned in a side end portion of the frame extends in a predetermined direction and has a first side frame piece and a second side frame piece partially overlapping each other in a direction of extension of the side frame and the side frame has an overlapping part where both the first side frame piece and the second side frame piece overlap each other. At the overlapping part, both the first side frame piece and the second side frame piece overlap each other in a state where a plurality of closed regions closed by being surrounded by both the first side frame piece and the second side frame piece are formed in a cross section of the overlapping part intersecting with the direction of extension.

In the conveyance seat of the present invention configured as described above, the plurality of closed regions closed by being surrounded by the side frame pieces are formed in the cross section of the part (overlapping part) where the side frame pieces overlap each other. By the plurality of closed regions being formed as described above, the rigidity of the overlapping part is further enhanced as compared with a configuration in which only one closed region is formed.

In the configuration described above, the plurality of closed regions may be aligned in a direction intersecting with each of the direction of extension and a width direction of the conveyance seat in the cross section.

In the configuration described above, the plurality of closed regions are aligned in the direction intersecting with each of the direction of extension of the side frame and the width direction of the conveyance seat. As a result, it is possible to improve the rigidity of the overlapping part in the direction in which the closed regions are aligned.

In the configuration described above, the plurality of closed regions may have a first closed region and a second closed region different in area from each other in the cross section.

In the configuration described above, the first closed region and the second closed region different in area from each other are formed in the cross section of the overlapping part. With such a configuration, it is possible to preferentially enhance the rigidity of the side where the wider of the first closed region and the second closed region is positioned in enhancing the rigidity of the overlapping part.

In the configuration described above, the second side frame piece may overlap the first side frame piece in a state where the second side frame piece is disposed closer to a middle of the frame than the first side frame piece in a width direction of the conveyance seat and a part positioned between the closed regions in the cross section may be provided with a raised region where the first side frame piece is raised toward the middle of the frame in the width direction.

In the configuration described above, the second side frame piece is positioned inside the first side frame piece in the width direction of the conveyance seat (seat width direction). In addition, the first side frame piece is provided with the raised region as a reinforcement portion and the raised region is raised toward the middle of the frame. With such a configuration, it is possible to improve the rigidity of the side frame (strictly speaking, the first side frame piece) while suppressing the side frame spreading outward in the seat width direction.

In the configuration described above, a corner portion of the second side frame piece in the cross section and a bent portion formed by the first side frame piece being bent so as to be diagonal to the corner portion may constitute one of the plurality of closed regions.

In the configuration described above, the corner portion of the second side frame piece and the bent portion of the first side frame piece diagonal to the corner portion constitute one of the plurality of closed regions. With such a configuration, the part of the first side frame piece where the bent portion is formed is positioned inside in the seat width direction. As a result, by the bent portion being formed, it is possible to improve the rigidity of the side frame (strictly speaking, the first side frame piece) while suppressing the side frame spreading outward in the seat width direction.

In the configuration described above, the first side frame piece may have a first end portion and a second end portion in a direction intersecting with each of the direction of extension and a width direction of the conveyance seat, the first end portion may extend toward a middle of the frame in the width direction and may be positioned on a side closer to an occupant than the second end portion in a state where the occupant is seated on the conveyance seat, and the bent portion may be positioned outside a part positioned closest to the middle of the frame in the first end portion in the width direction.

In the configuration described above, in the seat width direction, the bent portion is positioned outside the distal end part of the end portion of the first side frame piece on the side closer to the occupant (first end portion) in the direction of extension. With such a configuration, it is possible to suppress a space between the side frames being narrowed by the bent portion being formed.

In the configuration described above, the frame may have a pair of the side frames separated from each other in a width direction of the conveyance seat and a connecting frame interconnecting the side frames in the width direction and the connecting frame may partially overlap one side frame piece as one of the first side frame piece and the second side frame piece of the side frame in the width direction. At a frame overlapping part where the connecting frame and the one side frame piece overlap each other, the connecting frame and the one side frame piece may overlap each other in a state where a cross section of the frame overlapping part intersecting with the direction of extension forms a closed cross section closed by being surrounded by the connecting frame and the one side frame piece.

In the configuration described above, the cross section of the part where the side frame piece and the connecting frame overlap each other (frame overlapping part) is a closed cross section. With such a configuration, the rigidity of the frame overlapping part is appropriately ensured.

In the configuration described above, the first side frame piece and the second side frame piece may have first and second end portions in a direction intersecting with each of the direction of extension and a width direction of the conveyance seat, the first end portion may be positioned on a side closer to an occupant than the second end portion in a state where the occupant is seated on the conveyance seat, and the first end portion of one of the first side frame piece and the second side frame piece may be provided with a flange portion formed by being bent toward a side where the second end portion is positioned.

In the configuration described above, the end portion on the side closer to the occupant (first end portion) of either the first side frame piece or the second side frame piece is provided with the flange portion formed by being bent toward the side away from the occupant (side where the second end portion is positioned). With such a configuration, it is possible to suppress the quality (such as the ride quality) of the conveyance seat being affected by the flange portion being provided. In addition, the flange portion configured as described above is less likely to interfere with a surrounding member than a flange portion bent toward the side where the occupant is positioned.

Advantageous Effects of Invention

With the conveyance seat of the present invention, the rigidity of the part where the side frame pieces overlap each other (overlapping part) is further enhanced.

With the conveyance seat of the present invention, the rigidity of the overlapping part is improved in the direction in which the closed regions are aligned.

With the conveyance seat of the present invention, it is possible to preferentially enhance the rigidity of the side where the wider of the first closed region and the second closed region is positioned in enhancing the rigidity of the overlapping part.

With the conveyance seat of the present invention, it is possible to improve the rigidity of the side frame while suppressing the side frame spreading outward in the seat width direction.

With the conveyance seat of the present invention, by the bent portion being formed in the first side frame piece, it is possible to improve the rigidity of the first side frame piece while suppressing the side frame spreading outward in the seat width direction.

With the conveyance seat of the present invention, it is possible to suppress a seated occupant's space between the side frames being narrowed by the bent portion being formed.

With the conveyance seat of the present invention, the rigidity of the part where the side frame piece and the connecting frame overlap each other (frame overlapping part) is appropriately ensured.

With the conveyance seat of the present invention, it is possible to suppress the quality (such as the ride quality) of the conveyance seat being affected by one of the side frame pieces being provided with the flange portion. Further, interference with a surrounding member is less likely than in the case of a flange portion bent toward the side where an occupant is positioned.

DESCRIPTION OF EMBODIMENTS

Hereinafter, a conveyance seat according to an embodiment of the present invention (the present embodiment) will be described with reference to FIGS. 1 to 6. Although a configuration example of a vehicle seat as an example of the conveyance seat will be described below, the present invention is also applicable to conveyance seats other than the vehicle seat such as seats mounted in ships and aircraft.

In the following description, "front to back direction" is the front to back direction of the vehicle seat and is the direction that coincides with the traveling direction of a traveling vehicle. "Seat width direction" is the width direction of the vehicle seat and is the direction that coincides with the right to left direction as viewed from an occupant seated on the vehicle seat. "Up to down direction" is the up to down direction of the vehicle seat and is the direction that coincides with a vertical direction when the vehicle travels on a horizontal surface. "Front view" means that the vehicle seat or a vehicle seat component is viewed from the front side of the vehicle seat.

Incidentally, unless otherwise stated, the shape, the position, the posture, and the like of each portion of the seat described below are contents at a time when the vehicle seat is in a normal state (state where the vehicle seat allows seating and each portion of the seat is at a position allowing seating).

Basic Configuration of Vehicle Seat According to Present Embodiment

Figure 1:
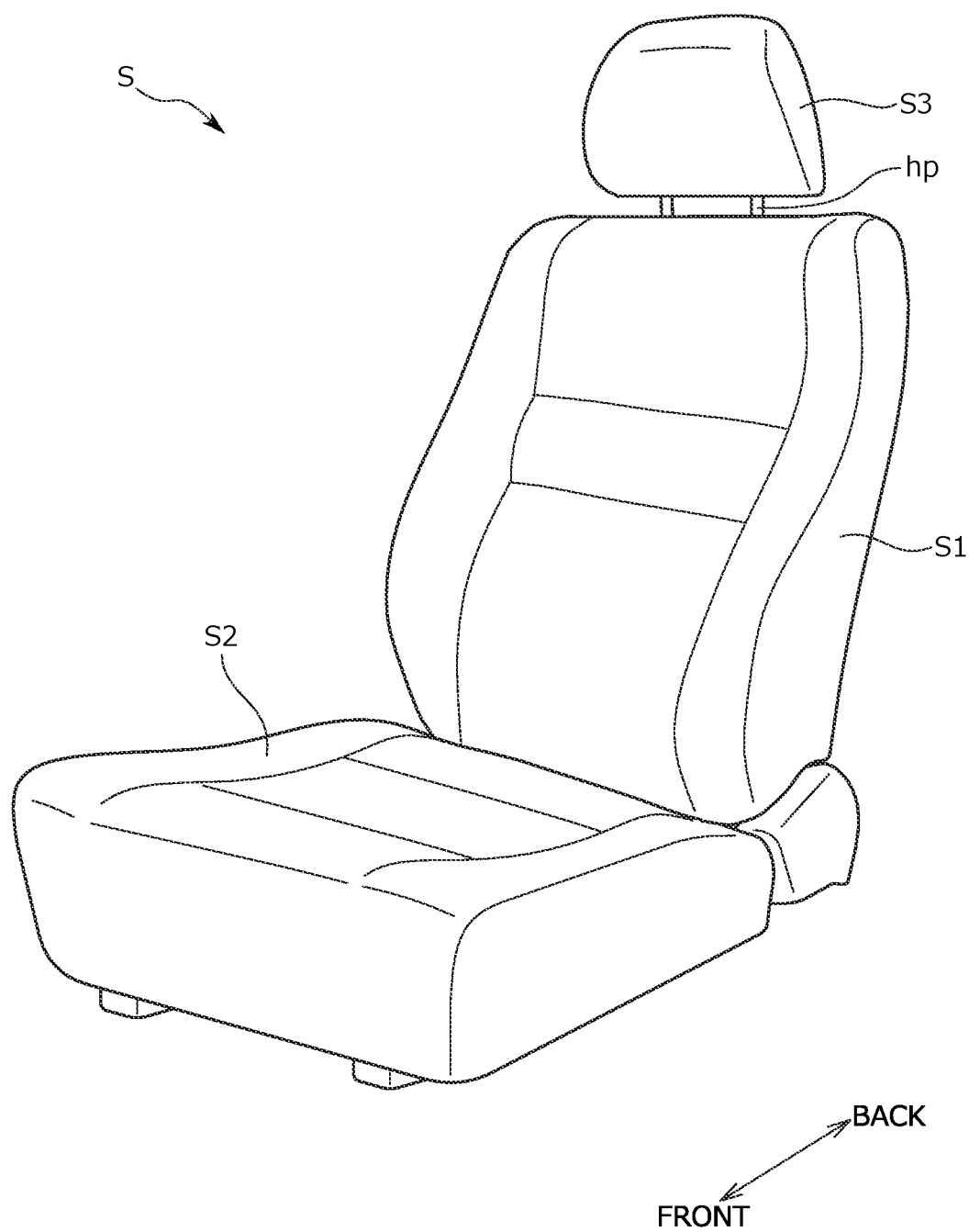
FIG. 1 is an outline view of a conveyance seat according to an embodiment of the present invention.
Figure 2:
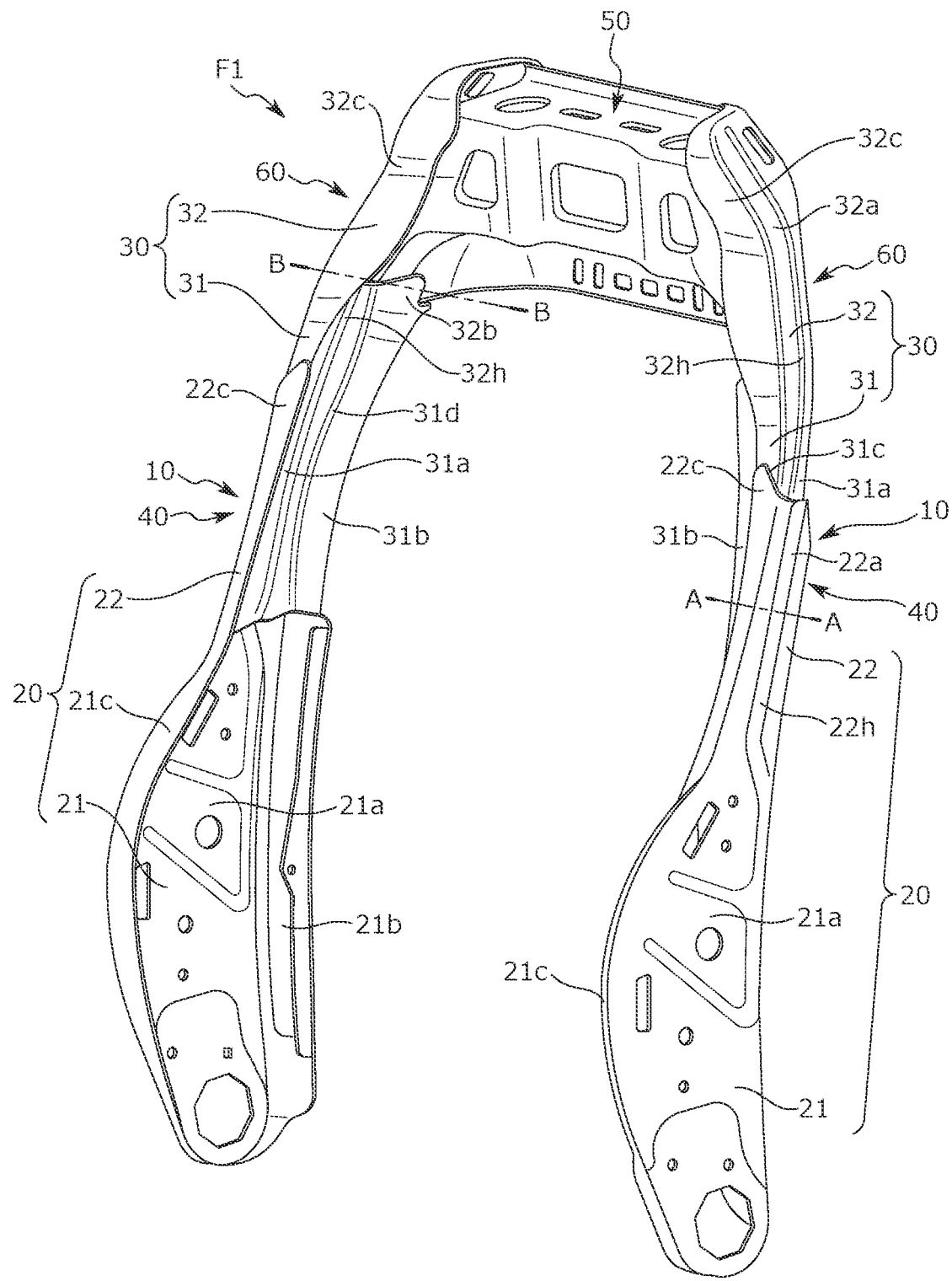
FIG. 2 is a perspective view of a frame of the conveyance seat according to an embodiment of the present invention.
Figure 3:
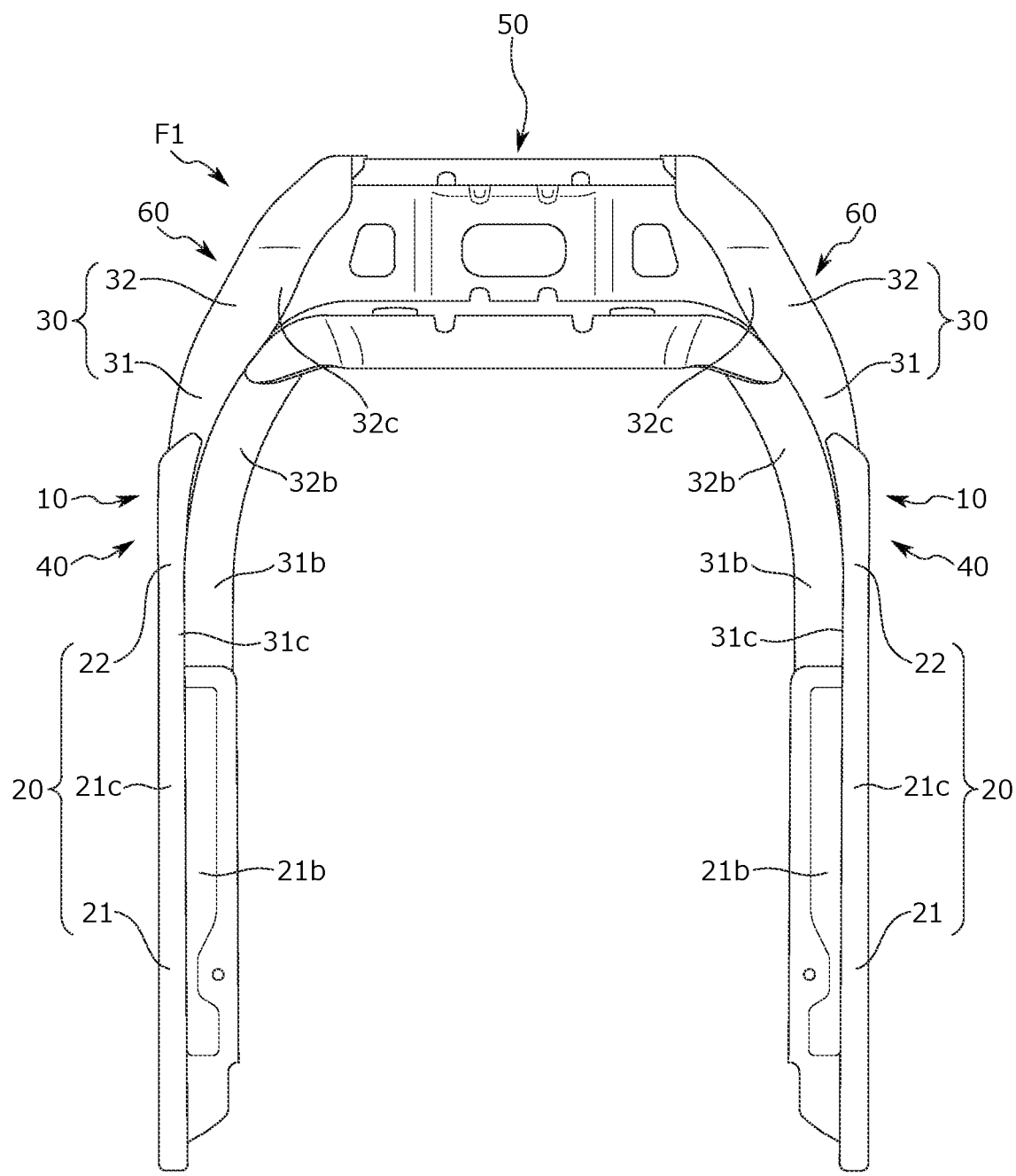
FIG. 3 is a front view of the frame of the conveyance seat according to an embodiment of the present invention.

A vehicle seat S has a seat back S1, a seat cushion S2, and a headrest S3 as illustrated in FIG. 1. In addition, the vehicle seat S has a frame in the seat. Specifically, a seat back frame F1 illustrated in FIGS. 2 and 3 is disposed in the seat back S1. The seat back S1 is configured by a pad material such as urethane being disposed in the front of the seat back frame F1 and the pad material being covered with a skin material.

The headrest S3 is held in a state of being disposed above the seat back S1. Specifically, the headrest S3 is provided with a pair of (right and left) headrest pillars hp extending downward. Each headrest pillar hp is inserted in a tubular pillar guide attached to the upper end portion of the seat back frame F1. As a result, the headrest S3 is disposed at a position above the seat back S1 via the headrest pillar hp and the pillar guide and is held at that position.

As illustrated in FIGS. 2 and 3, the seat back frame F1 has a pair of side frames 10 separated from each other in the seat width direction and a connecting frame 50 interconnecting the side frames 10 in the seat width direction.

The side frame 10 is positioned in a side end portion of the seat back frame F1 and extends in a predetermined direction. Strictly speaking, the side frame 10 extends in a direction slightly inclined (inclined backward) with respect to the up to down direction. A member separate from the side frame 10 constitutes the connecting frame 50. The connecting frame 50 interconnects the upper end portions of the pair of right and left side frames 10 (strictly speaking, the upper end portions of second side frame pieces 30 to be described later). In the present embodiment, the connecting frame 50 is assembled to the side frame 10 by being welded to the upper end portion of the side frame 10.

Hereinafter, the structure of the side frame 10 and the structure of the connecting frame 50 will be described in detail with reference to FIGS. 2 to 5.

Two parts (side frame pieces) divided in the up to down direction constitute the side frame 10 according to the present embodiment. Specifically, each side frame 10 is configured by a lower positioning first side frame piece 20 and the upper positioning second side frame piece 30 being combined so as to be aligned in the up to down direction.

The first side frame piece 20 is made of a metal plate processed in a predetermined shape and forms the lower side part of the side frame 10. The first side frame piece 20 has a lower portion (hereinafter, first side frame piece lower portion 21) and an upper portion (hereinafter, first side frame piece upper portion 22). As illustrated in FIG. 2, the first side frame piece lower portion 21 is provided with a side wall 21a that is substantially semicircular in side view, a rear wall 21b that extends inward in the seat width direction from the rear end of the side wall 21a, and a front wall 21c that extends inward in the seat width direction from the front end of the side wall 21a.

The side wall 21a bulges forward from the upper end position of the side wall 21a to the middle position. The side wall 21a is shaped so as to gradually narrow from the middle position toward the lower end position of the side wall 21a. The rear wall 21b is provided from the upper end to the lower end of the side wall 21a and somewhat overhangs inward in the seat width direction. The front wall 21c is provided from the upper end of the side wall 21a to the lower end of the side wall 21a. As illustrated in FIG. 2, the front wall 21c is provided from the upper end to the lower end of the side wall 21a, turns backward at the lower end of the side wall 21a and is continuous with the rear wall 21b. The amount of extension (overhanging) of the front wall 21c in the seat width direction is shorter than the amount of extension of the rear wall 21b. In other words, the rear wall 21b extends so as to be positioned closer to the middle of the frame than the front wall 21c. The "middle of the frame" refers to the middle position of the seat back frame F1 in the seat width direction (that is, the position that is at an equal distance from each of the pair of right and left side frames 10).

As illustrated in FIGS. 2 and 3, the first side frame piece upper portion 22 is continuous with the first side frame piece lower portion 21 and extends upward from the upper end of the first side frame piece lower portion 21. The first side frame piece upper portion 22 is provided with a side wall 22a illustrated in FIGS. 2 and 3, a rear wall 22b illustrated in FIG. 4, and a front wall 22c illustrated in FIGS. 2 to 4.

The side wall 22a is continuous with the side wall 21a of the first side frame piece lower portion 21 and extends with a slight length along the direction of extension of the side frame 10. As illustrated in FIG. 2, a reinforcement bead 22h is formed at the middle part of the side wall 22a in the front to back direction. The reinforcement bead 22h is a raised region formed by the side wall 22a being raised outward in the seat width direction. The reinforcement bead 22h is formed with length along the direction of extension of the side frame 10 from the upper end of the side wall 22a.

The rear wall 22b extends from the rear end of the side wall 22a toward the inner side in the seat width direction (that is, the middle of the frame) and is provided from the upper end of the side wall 22a to the lower end of the side wall 22a. The rear wall 22b is continuous with the rear wall 21b of the first side frame piece lower portion 21.

Figure 4:
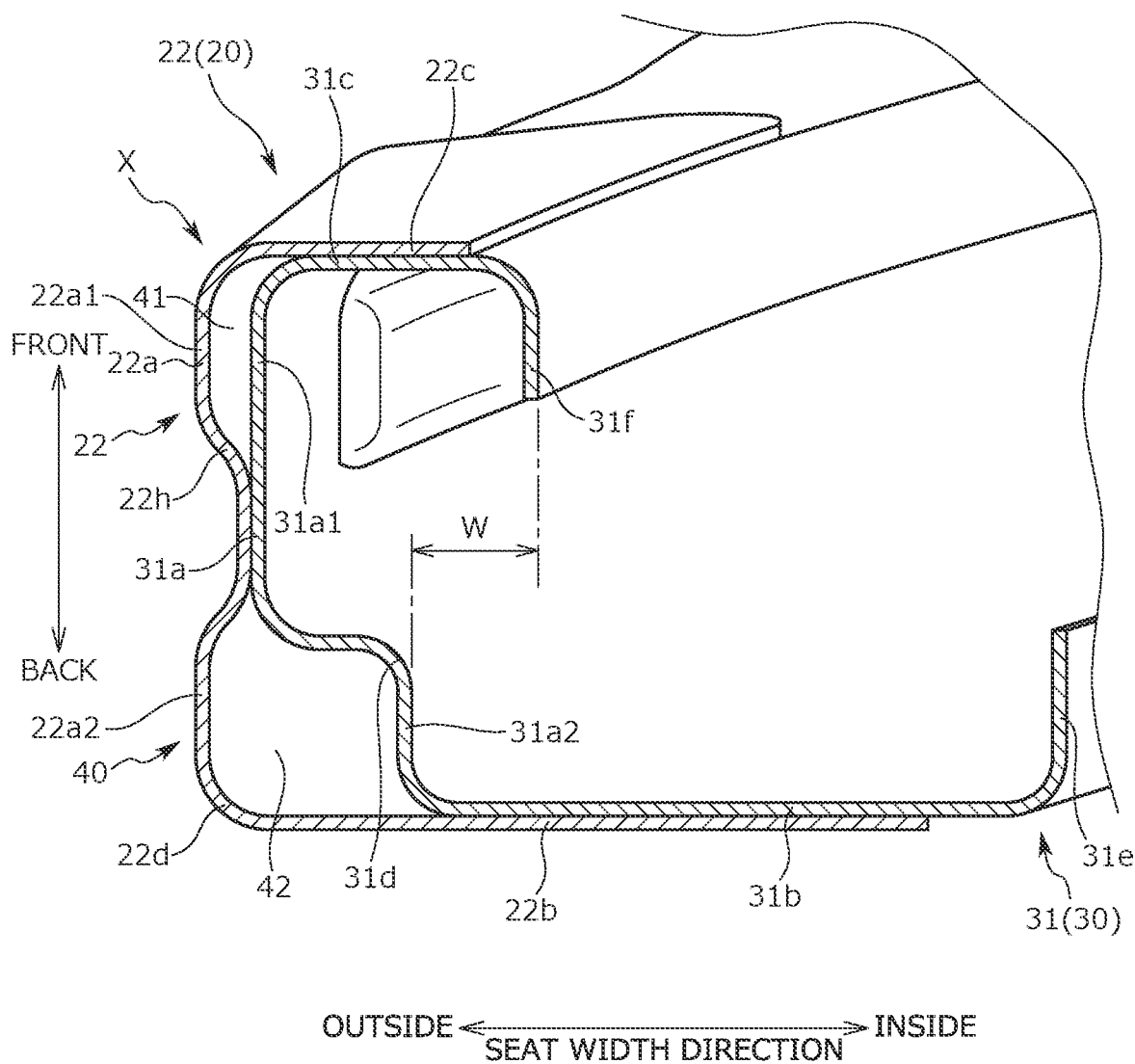
FIG. 4 is a diagram illustrating the A-A cross section in FIG. 2.

The front wall 22c extends from the front end of the side wall 22a toward the inner side in the seat width direction (that is, the middle of the frame) and is provided from the upper end to the lower end of the side wall 22a. The front wall 22c is continuous with the front wall 21c of the first side frame piece lower portion 21. Incidentally, as illustrated in FIG. 4, the breadth (length in the seat width direction) of the front wall 22c of the first side frame piece upper portion 22 is somewhat shorter than the breadth of the rear wall 22b of the first side frame piece upper portion 22.

In the present embodiment, the upper end of the front wall 22c is cut obliquely with respect to the direction of extension of the side frame 10 as illustrated in FIGS. 2 and 3.

Here, the rear wall 22b and the front wall 22c correspond to the end portion of the first side frame piece 20 in the front to back direction (that is, a direction intersecting with each of the direction of extension of the side frame 10 and the seat width direction). The front wall 22c corresponds to a first end portion positioned on a side closer to an occupant than the rear wall 22b in a state where the occupant is seated on the vehicle seat S. The rear wall 22b corresponds to a second end portion positioned on a side farther from the occupant than the front wall 22c in the state where the occupant is seated on the vehicle seat S. In the first side frame piece upper portion 22, the rear end portion of the side wall 22a and the rear wall 22b are substantially orthogonal to each other and form a corner portion 22d as illustrated in FIG. 4.

The second side frame piece 30 forms the upper side part of the side frame 10. A metal plate constitutes the second side frame piece 30. The second side frame piece 30 is folded a plurality of times and is similar in shape to a lip groove side steel. As illustrated in FIGS. 2 and 3, the second side frame piece 30 has a lower portion (hereinafter, second side frame piece lower portion 31) and an upper portion (hereinafter, second side frame piece upper portion 32).

The second side frame piece lower portion 31 and the first side frame piece upper portion 22 overlap each other. In this manner, the first side frame piece 20 and the second side frame piece 30 constitute the side frame 10 by partially overlapping each other in the direction of extension of the side frame 10. In other words, the side frame 10 has an overlapping part 40 configured by the first side frame piece upper portion 22 and the second side frame piece lower portion 31 overlapping each other.

Incidentally, as illustrated in FIG. 4, at the overlapping part 40, the second side frame piece lower portion 31 overlaps the first side frame piece upper portion 22 in a state where the second side frame piece lower portion 31 is disposed inside the first side frame piece upper portion 22 in the seat width direction (that is, closer to the middle of the frame).

The first side frame piece upper portion 22 and the second side frame piece lower portion 31 are joined by welding (more strictly, laser welding) in a state where the first side frame piece upper portion 22 and the second side frame piece lower portion 31 overlap each other. Here, the upper end of the front wall 22c of the first side frame piece upper portion 22 is included in the point of welding of the second side frame piece lower portion 31 in the first side frame piece upper portion 22. The upper end of the front wall 22c of the first side frame piece upper portion 22 is cut obliquely with respect to the direction of extension of the side frame 10 as described above. Accordingly, it is possible to ensure a longer welding margin (welding length) at the upper end of the front wall 22c of the first side frame piece upper portion 22 in welding the first side frame piece upper portion 22 and the second side frame piece lower portion 31.

The configuration of the second side frame piece lower portion 31 will be described below. The second side frame piece lower portion 31 extends along the direction of extension of the side frame 10 and has a side wall 31a, a rear wall 31b, and a front wall 31c illustrated in FIG. 4. The side wall 31a extends along the direction of extension of the side frame 10. The side wall 31a is along the side wall 22a of the first side frame piece upper portion 22 and has substantially the same width as the side wall 22a of the first side frame piece upper portion 22 in the front to back direction.

As illustrated in FIG. 4, the rear wall 31b is substantially orthogonal to the side wall 31a and extends from the rear end of the side wall 31a toward the inner side in the seat width direction (that is, the middle of the frame). The rear wall 31b is provided from the upper end to the lower end of the side wall 31a and extends somewhat inward in the seat width direction. The rear wall 31b is mostly along the rear wall 22b of the first side frame piece upper portion 22 and extends with length slightly inward of the rear wall 22b of the first side frame piece upper portion 22 in the seat width direction.

As illustrated in FIG. 4, the boundary part between the side wall 31a and the rear wall 31b is bent in an L shape and forms a bent portion 31d. The bent portion 31d is bent such that the apex (point corresponding to an L-shaped bending point) of the bent portion 31d is closer to the inner side in the seat width direction (that is, the middle of the seat). As illustrated in FIG. 4, the bent portion 31d is provided at a position diagonal to the corner portion 22d of the first side frame piece upper portion 22 (that is, the boundary part between the side wall 22a and the rear wall 22b) at the overlapping part 40 (strictly speaking, a cross section X1 of the overlapping part 40). Incidentally, the size of the bent portion 31d can be freely designed in accordance with seat specifications.

As illustrated in FIG. 4, the rear wall 31b is provided with a rear flange portion 31e for reinforcement. The rear flange portion 31e is formed by the end portion of the rear wall 31b that is on the inner side in the seat width direction (distal end portion in the direction of extension) being bent toward the front (that is, the side where the front wall 31c is positioned).

As illustrated in FIG. 4, the front wall 31c is substantially orthogonal to the side wall 31a and extends from the front end of the side wall 31a toward the inner side in the seat width direction (that is, the middle of the frame). The front wall 31c is provided from the upper end to the lower end of the side wall 31a and extends somewhat inward in the seat width direction. The amount of extension (overhanging) of the front wall 31c in the seat width direction is shorter than the amount of extension of the rear wall 31b. In other words, the rear wall 31b extends so as to be positioned closer to the middle of the frame than the front wall 31c.

The front wall 31c is mostly along the front wall 22c of the first side frame piece upper portion 22 and extends with a slight length inward of the front wall 22c of the first side frame piece upper portion 22 in the seat width direction.

As illustrated in FIG. 4, the front wall 31c is provided with a front flange portion 31f for reinforcement. The front flange portion 31f is a flange portion provided on the second side frame piece 30 (one side frame piece). The front flange portion 31f is formed by the end portion of the front wall 31c that is on the inner side in the seat width direction (distal end portion in the direction of extension) being bent toward the back (that is, the side where the rear wall 31b is positioned).

Here, the rear wall 31b and the front wall 31c correspond to the end portion of the second side frame piece 30 in the front to back direction (that is, a direction intersecting with each of the seat width direction and the direction of extension of the side frame 10). The front wall 31c corresponds to a first end portion positioned on a side closer to an occupant than the rear wall 31b in a state where the occupant is seated on the vehicle seat S. The rear wall 31b corresponds to a second end portion positioned on a side farther from the occupant than the front wall 31c in the state where the occupant is seated on the vehicle seat S.

As illustrated in FIGS. 2 and 3, the second side frame piece upper portion 32 is continuous with the second side frame piece lower portion 31 and extends upward from the upper end of the second side frame piece lower portion 31. The second side frame piece upper portion 32 is gently curved so as to be directed gradually inward in the seat width direction as the second side frame piece upper portion 32 heads upward. The second side frame piece upper portion 32 has a side wall 32a, a rear wall 32b, and a front wall 32c as illustrated in FIGS. 2 and 3.

The side wall 32a is continuous with the side wall 31a of the second side frame piece lower portion 31 and is curved in a circular arc shape so as to be directed inward in the seat width direction as the side wall 32a heads upward. As illustrated in FIG. 2, a reinforcement bead 32h is formed at the middle part of the side wall 32a in the front to back direction. The reinforcement bead 32h is formed by the side wall 32a being raised outward in the seat width direction. The reinforcement bead 32h is formed from the upper end to the lower end of the side wall 32a.

In a state where the first side frame piece upper portion 22 and the second side frame piece lower portion 31 overlap each other, the reinforcement bead 22h formed on the side wall 22a of the first side frame piece upper portion 22 and the reinforcement bead 32h formed on the side wall 32a of the second side frame piece upper portion 32 are arranged so as to be continuous as illustrated in FIG. 2.

The rear wall 32b extends inward in the seat width direction from the rear end of the side wall 32a and is provided from the upper end to the lower end of the side wall 32a. The rear wall 32b is curved in a circular arc shape so as to be directed inward in the seat width direction as the rear wall 32b heads upward. The rear wall 32b is continuous with the rear wall 31b of the second side frame piece lower portion 31.

The front wall 32c extends inward in the seat width direction from the front end of the side wall 32a and is provided from the upper end to the lower end of the side wall 32a. The front wall 32c is curved in a circular arc shape so as to be directed inward in the seat width direction as the front wall 32c heads upward. The front wall 32c is continuous with the front wall 31c of the second side frame piece lower portion 31. As illustrated in FIG. 3, the lower end portion of the front wall 32c is configured to narrow downward.

The connecting frame 50 according to the present embodiment is formed of a metal plate folded a plurality of times in the front to back direction and the up to down direction and extends along the seat width direction. Both end portions of the connecting frame 50 in the seat width direction are respectively welded to the second side frame piece upper portion 32.

Figure 5:
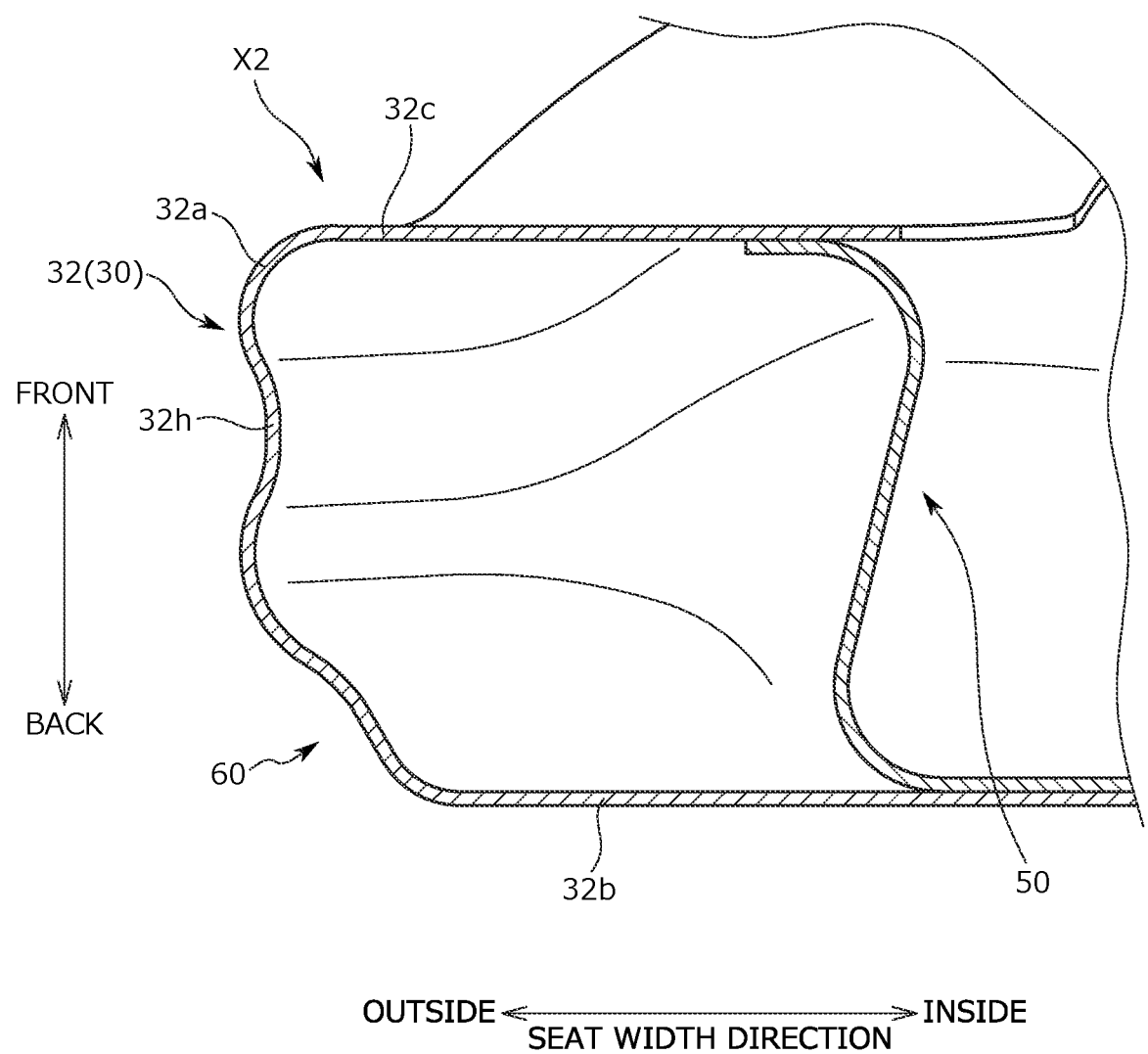
FIG. 5 is a diagram illustrating the B-B cross section in FIG. 2.

More specifically, the connecting frame 50 has an end portion in the space surrounded by the respective upper end portions of the side wall 32a, the rear wall 32b, and the front wall 32c in the second side frame piece upper portion 32 as illustrated in FIG. 5. The end portion of the connecting frame 50 in the space is welded (strictly speaking, laser-welded) to each of the side wall 32a, the rear wall 32b, and the front wall 32c. As a result, the connecting frame 50 is joined to the second side frame piece upper portion 32.

As described above, in the present embodiment, the connecting frame 50 partially overlaps the second side frame piece 30 (corresponding to one side frame piece) in the seat width direction. In other words, the upper end portion of the seat back frame F1 is provided with a frame overlapping part 60 where the connecting frame 50 and the second side frame piece 30 overlap each other.

As illustrated in FIG. 5, at the frame overlapping part 60, the connecting frame 50 and the second side frame piece 30 overlap each other in a state where a cross section X2 (cross section intersecting with the direction of extension of the side frame 10) is a closed cross section, which means "a state where a closed cross section" is formed by being surrounded by the connecting frame 50 and the second side frame piece upper portion 32 of the second side frame piece 30 as illustrated in FIG. 5.

The reinforcement bead 32h formed on the side wall 32a of the second side frame piece upper portion 32 reaches the range in which the frame overlapping part 60 is provided in the direction of extension of the side frame 10 as illustrated in FIGS. 2 and 5.

<<Regarding Details of Overlapping Part>>

The overlapping part 40 will be described in detail with reference to FIG. 4. The first side frame piece upper portion 22 and the second side frame piece lower portion 31 overlap each other at the overlapping part 40.

At the overlapping part 40, both the first side frame piece upper portion 22 and the second side frame piece lower portion 31 overlap each other in a state where a plurality of closed regions are formed in the cross section X1 of the overlapping part 40 (strictly speaking, a cross section intersecting with the direction of extension of the side frame 10). The "closed region" is a region closed by being surrounded by both the first side frame piece upper portion 22 and the second side frame piece lower portion 31.

The cross section X1 has a first closed region 41 and a second closed region 42 aligned in the front to back direction (direction intersecting with each of the seat width direction and the direction of extension of the side frame 10). By the plurality of closed regions being formed in the cross section X1 of the overlapping part 40 as described above, it is possible to effectively increase the section modulus of the overlapping part 40. As a result, the rigidity of the overlapping part 40 is effectively enhanced in the vehicle seat S.

Incidentally, the two closed regions are formed so as to differ in area from each other in the cross section X1 (that is, the areas surrounded by the respective closed regions). Specifically, the area of the second closed region 42 is larger than the area of the first closed region 41 as illustrated in FIG. 4. With such a configuration, it is possible to preferentially enhance the rigidity of the part (specifically, the front part) of the overlapping part 40 on the side where the first closed region 41 is positioned. However, the present invention is not limited thereto and the area of the first closed region 41 may be larger than the area of the second closed region 42. In addition, the area of the second closed region 42 may be equal to the area of the first closed region 41.

Each closed region will be described below. The first closed region 41 is formed forward as illustrated in FIG. 4. The first closed region 41 is surrounded by the front end portion of the side wall 22a and the front wall 22c of the first side frame piece upper portion 22 and the side wall 31a of the second side frame piece lower portion 31. The first closed region 41 is a flat closed region that is long in the front to back direction.

The second closed region 42 is formed backward as illustrated in FIG. 4. The second closed region 42 is a substantially square closed region constituted by the corner portion 22d formed by the side wall 22a and the rear wall 22b of the first side frame piece upper portion 22 and the bent portion 31d formed by the rear wall 31b of the second side frame piece lower portion 31.

Incidentally, as illustrated in FIG. 4, the bent portion 31d is positioned outside the inside end of the front wall 31c of the second side frame piece lower portion 31 (part positioned closest to the middle of the frame) in the seat width direction. Describing clearly with reference to FIG. 4, in the seat width direction, the bent portion 31d is positioned outside the inside end of the front wall 31c by a distance w illustrated in FIG. 4. As described above, in the present embodiment, the bent portion 31d is provided in the second side frame piece lower portion 31 so as to be close to the outer side in the seat width direction. With such a configuration, it is possible to suppress an occupant feeling cramped on the seat (specifically, the feeling is a sense that the space between the side frames 10 is narrowed by the bent portion 31d being formed).

As illustrated in FIG. 4, the reinforcement bead 22h is disposed at the part positioned between the closed regions 41 and 42 in the cross section X1 and the reinforcement bead 22h is formed by the side wall 22a of the first side frame piece upper portion 22 being raised toward the inner side in the seat width direction (side on which the second side frame piece lower portion 31 is positioned). In the present embodiment, the reinforcement bead 22h is disposed at a position substantially intermediate between the first closed region 41 and the second closed region 42 in the front to back direction. However, the position of the reinforcement bead 22h is not particularly limited. The position may be closer to the first closed region 41 or closer to the second closed region 42.

Although an embodiment of the present invention has been described above by way of example, the embodiment described above is for the purpose of facilitating the understanding of the present invention and does not limit the present invention. In other words, the present invention can be modified and improved without departing from the gist of the present invention and it is a matter of course that the present invention includes equivalents of the present invention.

Figure 6:
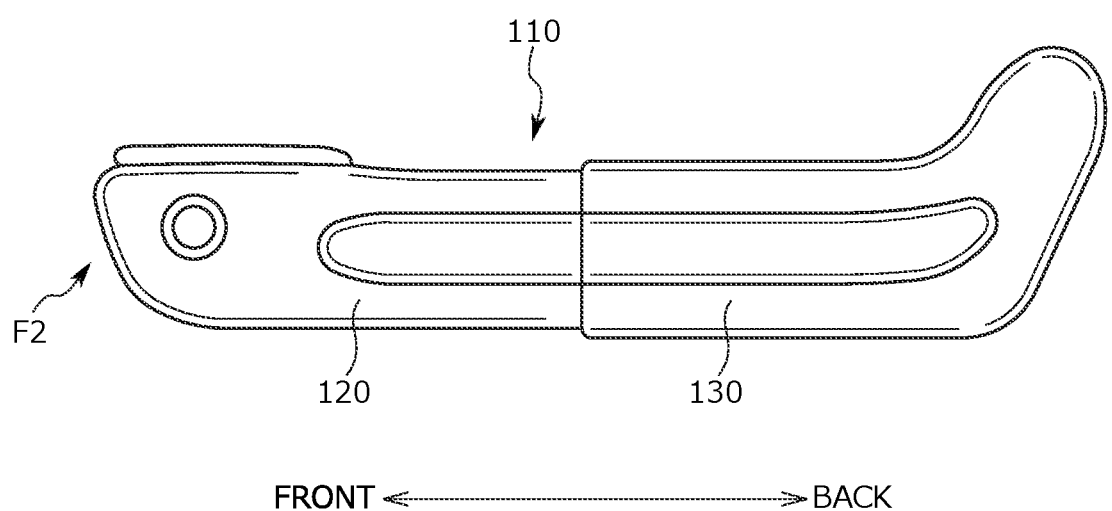
FIG. 6 is a side view of a seat cushion frame.

In the configuration of the embodiment described above, the side frame 10 of the seat back frame F1 is divided into two side frame pieces of upper and lower (the first side frame piece 20 and the second side frame piece 30) and the side frame pieces partially overlap each other. However, the present invention is not limited thereto. The present invention is also applicable to a configuration in which a side frame 110 of a seat cushion frame F2 is divided into two side frame pieces of front and rear (a first side frame piece 120 and a second side frame piece 130) and the side frame pieces partially overlap each other as illustrated in FIG. 6. In other words, insofar as a plurality of closed regions are formed as in the configuration illustrated in FIG. 4 in the cross section of the overlapping part where the side frame pieces overlap each other in the side frame 110 of the seat cushion frame F2 (cross section the normal direction of which is the front to back direction), it is possible to ensure the rigidity of the overlapping part to a sufficient extent.

Configuration of Seat Back Frame According to Reference Example

Next, another embodiment of the seat back frame F1 having the side frame 10 configured by two side frame pieces of upper and lower overlapping each other will be described as a reference example of the seat back frame of the present invention.

In describing the seat back frame F1 according to the reference example, problems to be solved by the seat back frame F1 according to the reference example will be described. Some conveyance seats provided with a seat back and a headrest are provided with a plate-shaped connecting member interconnecting side frames in a seat back frame. Further, in some conveyance seats provided with the connecting member, the connecting member is provided with a holding member to hold the headrest. Conceivable in such a configuration is, for example, to attach a pillar guide to the connecting member by forming a hole in the upper wall of the connecting member and inserting the pillar guide as a holding member into the hole.

However, the conveyance seat configured as described above has a risk that the holding member attached to the connecting member may move (rattle) with respect to the connecting member. Once the holding member rattles, contact between the holding member and the connecting member results in an abnormal (unpleasant) noise.

In contrast, the seat back frame F1 according to the reference example is capable of suppressing the rattling of the holding member. Hereinafter, the seat back frame F1 according to the reference example will be described based on a plurality of embodiments (first, second and third embodiments).

Incidentally, in the reference example, a pillar guide G corresponds to a holding member provided so that the headrest S3 is held and is substantially identical in configuration to a pillar guide used in a general vehicle seat.

First Embodiment of Reference Example

The configuration of the seat back frame F1 according to the first embodiment of the reference example will be described with reference to FIGS. 7 to 10. Incidentally, in FIGS. 9 and 10, the pillar guide G is omitted for convenience of illustration.

Figure 7:
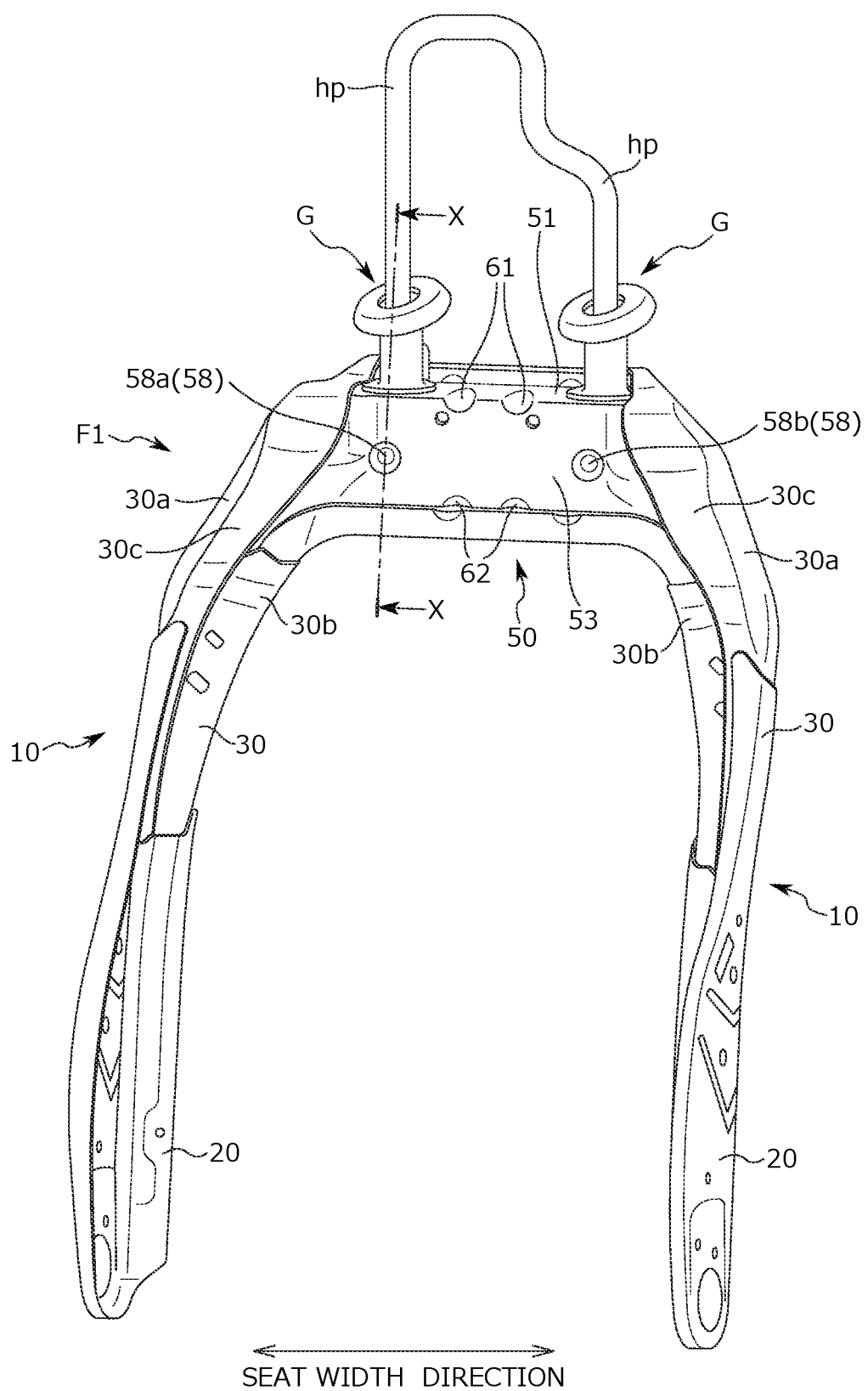
FIG. 7 is a perspective view of a seat back frame according to a reference example.
Figure 9:
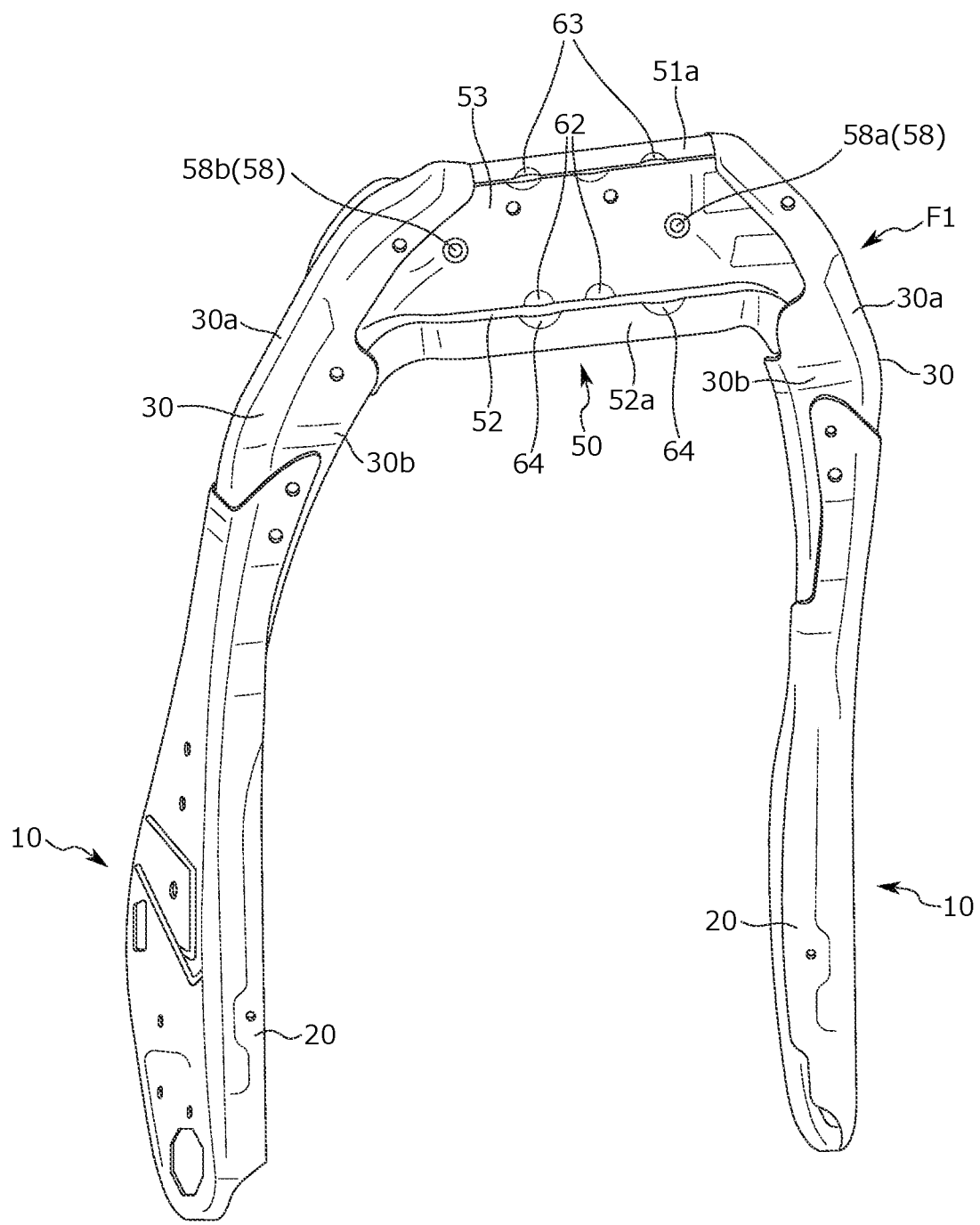
FIG. 9 is a diagram in which the seat back frame according to the reference example is viewed from behind.

The seat back frame F1 has the pair of right and left side frames 10, the connecting frame 50 interconnecting the side frames 10, and a pair of the pillar guides G as illustrated in FIGS. 7 and 9.

The side frame 10 is made of a metal plate molded in a predetermined shape and is provided in both side portions of the seat back frame F1. Each side frame 10 is divided into two in the up to down direction and is configured by the lower first side frame piece 20 and the upper second side frame piece 30 partially overlapping each other.

The connecting frame 50 corresponds to a plate-shaped connecting member and is made of a metal plate folded a plurality of times in the front to back direction and the up to down direction. The connecting frame 50 is bridged between the side frames 10 in the seat width direction and interconnects the side frames 10 separated in the seat width direction. Both end portions of the connecting frame 50 in the seat width direction are respectively welded to the upper end portion of the second side frame piece 30.

Figure 10:
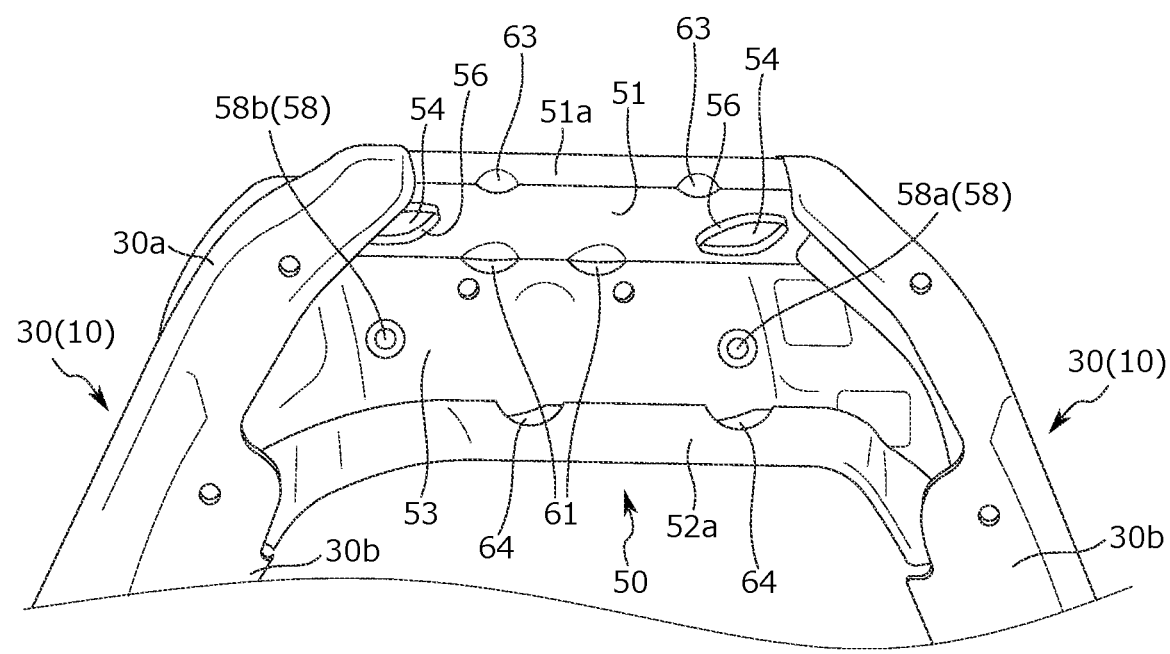
FIG. 10 is a view of the front side part of a connecting member as viewed obliquely from below the connecting member.

More specifically, the upper end portion of the second side frame piece 30 is bent in a substantially U shape and has a side wall 30a, a rear wall 30b, and a front wall 30c illustrated in FIGS. 7, 9, and 10. The side wall 30a is the part that is positioned on the outermost side in the seat width direction in the second side frame piece 30. The rear wall 30b is a part extending inward in the seat width direction from the rear end of the side wall 30a. The front wall 30c is a part extending inward in the seat width direction from the front end of the side wall 30a.

The connecting frame 50 has an end portion in the space surrounded by the side wall 30a, the rear wall 30b, and the front wall 30c in the upper end portion of the second side frame piece 30 and the end portion is welded (strictly speaking, laser-welded) to each of the side wall 30a, the rear wall 30b, and the front wall 30c. As a result, the connecting frame 50 is joined to the upper end portion of the second side frame piece 30.

Figure 8:
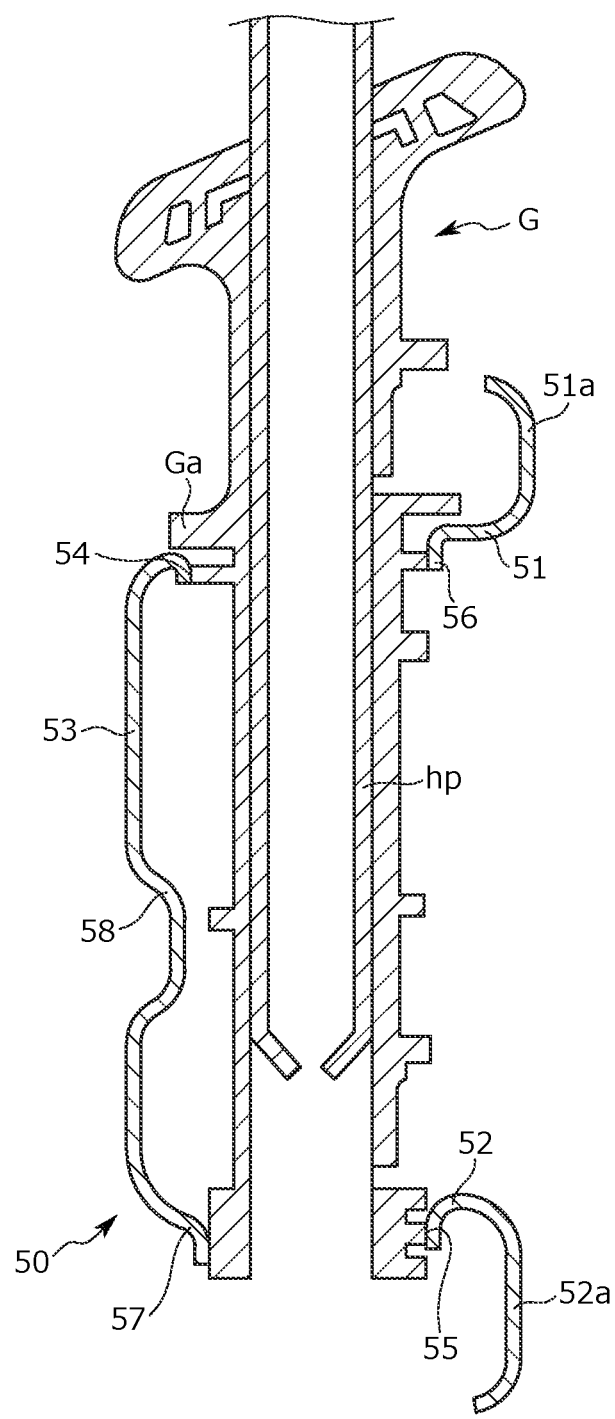
FIG. 8 is a diagram illustrating the X-X cross section in FIG. 7.

The pair of right and left pillar guides G are provided. Each pillar guide G extends along the up to down direction (strictly speaking, the direction of extension of the side frame 10) and is disposed at a position corresponding to the headrest pillar hp in the seat width direction. Each pillar guide G is attached to the connecting frame 50 as illustrated in FIG. 8.

More specifically, the connecting frame 50 is folded in a substantially U shape in side view. Each pillar guide G is attached to the connecting frame 50 so as to penetrate the substantially C-shaped connecting frame 50. In a state where the pillar guide G is attached to the connecting frame 50, the upper end portion of the pillar guide G protrudes above an upper wall portion 51 of the connecting frame 50 as illustrated in FIG. 8.

Here, the configuration of the connecting frame 50 including the shape of the connecting frame 50 will be described with reference to FIGS. 7 to 13. Incidentally, in FIGS. 11 and 12, the pillar guide G is omitted for convenience of illustration.

The connecting frame 50 has the upper wall portion 51 as a first part, a lower wall portion 52 as a second part, and a front wall portion 53 as a third part as illustrated in FIGS. 10 to 13. The upper wall portion 51 is a part extending along the seat width direction. The lower wall portion 52 is positioned directly below the upper wall portion 51 and extends along the seat width direction so as to be substantially parallel to the upper wall portion 51.

Figure 11:
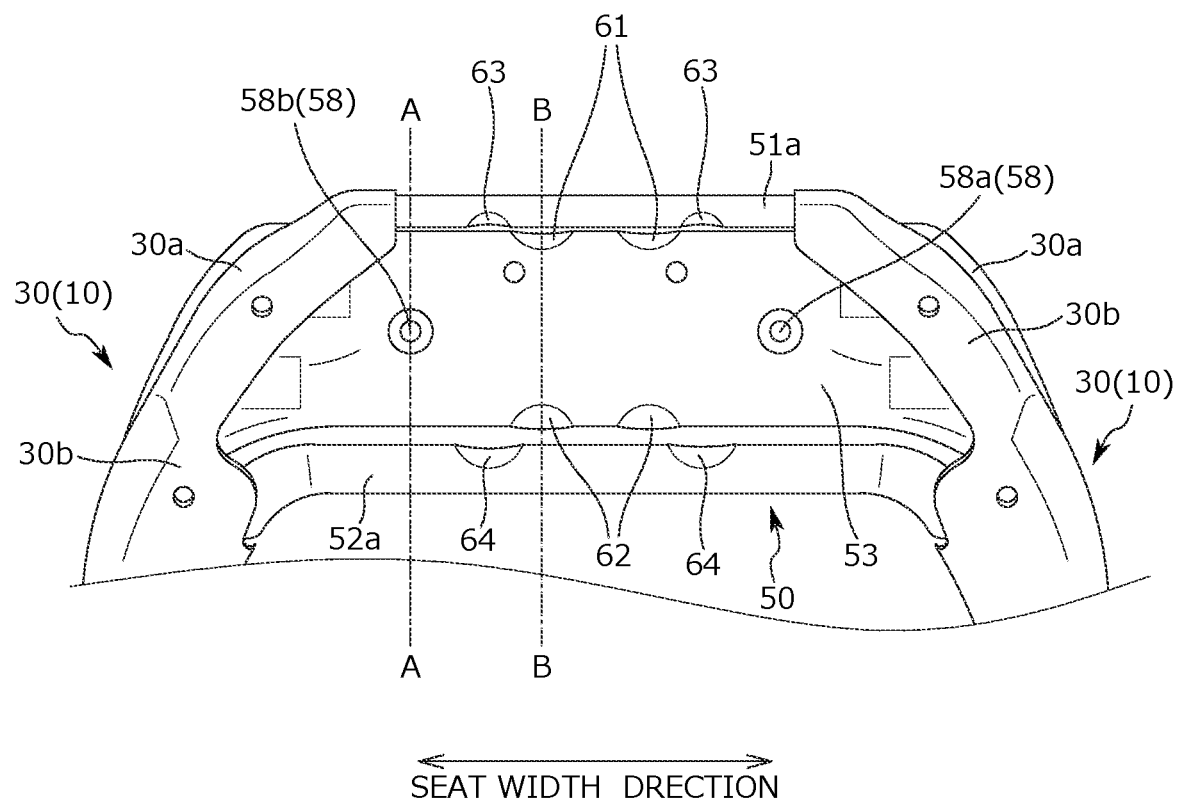
FIG. 11 is a view of the rear side part of the connecting member as viewed from the rear of the connecting member.
Figure 12:
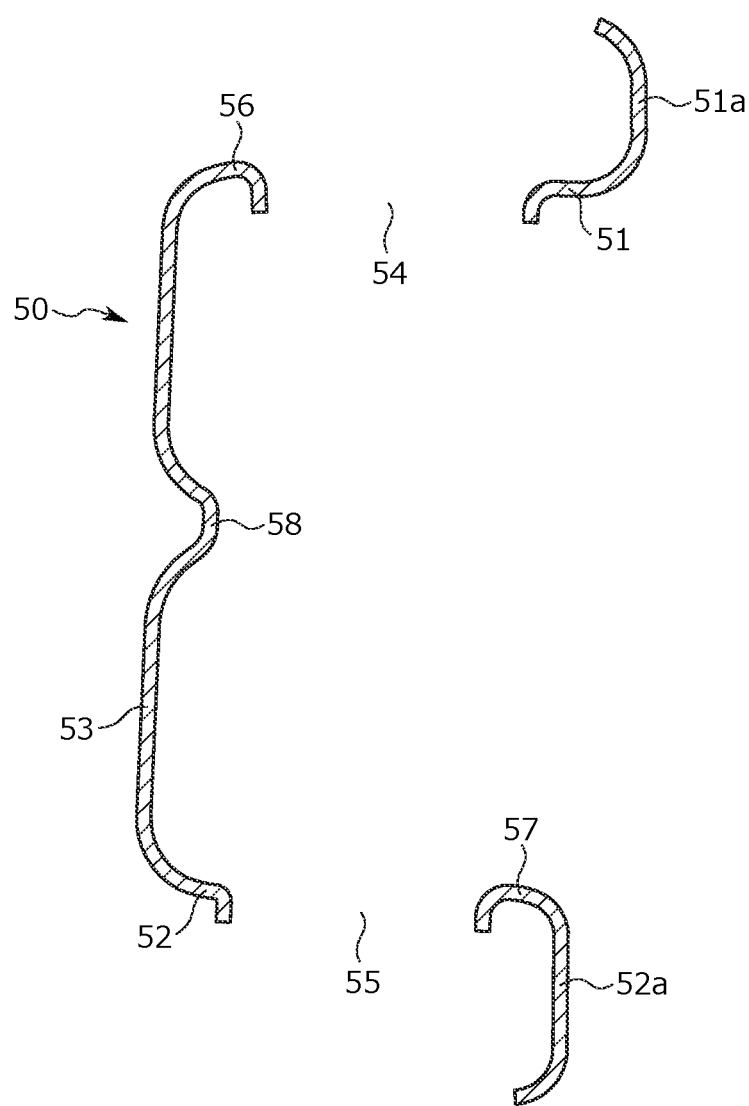
FIG. 12 is a diagram illustrating the A-A cross section in FIG. 11.

As illustrated in FIG. 8, the pillar guide G is attached to each of the upper wall portion 51 and the lower wall portion 52 in a state of intersecting with (strictly speaking, being substantially orthogonal to) the pillar guide G. More specifically, as illustrated in FIGS. 11 and 12, the upper wall portion 51 and the lower wall portion 52 are provided with substantially rectangular hole-shaped insertion holes 54 and 55 formed so that the pillar guide G is attached. Two insertion holes 54 and two insertion holes 55 are provided at intervals in the seat width direction. The insertion holes 54 and 55 positioned on the same side in the seat width direction are aligned in the up to down direction.

Each pillar guide G is attached to the connecting frame 50 by being inserted into the respective insertion holes 54 and 55 of the upper wall portion 51 and the lower wall portion 52. Specifically, with each pillar guide G inserted in the insertion holes 54 and 55, a flange portion Ga provided at a halfway position of the pillar guide G in the direction of extension is locked to an edge portion 56 positioned around the insertion hole 54 in the upper wall portion 51 as illustrated in FIG. 8. As a result, each pillar guide G is attached to both the upper wall portion 51 and the lower wall portion 52.

Figure 13:
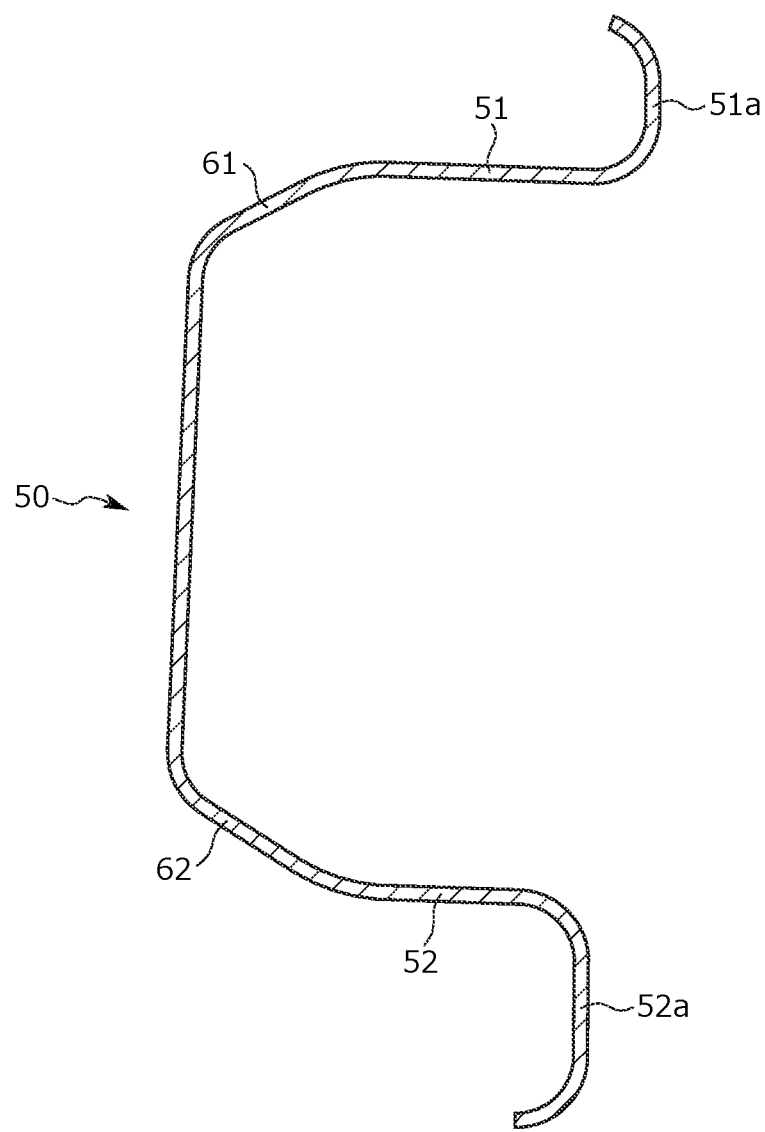
FIG. 13 is a diagram illustrating the B-B cross section in FIG. 11.

Incidentally, the edge portion 56 and an edge portion 57 around the insertion holes 54 and 55 in each of the upper wall portion 51 and the lower wall portion 52 are burred as illustrated in FIG. 12 and are folded downward. As illustrated in FIGS. 12 and 13, the rear end portion of the upper wall portion 51 is bent in an L shape so as to be directed upward and constitutes an upward bent portion 51a. As illustrated in FIGS. 12 and 13, the rear end portion of the lower wall portion 52 is bent in an L shape so as to be directed downward and constitutes a downward bent portion 52a.

The front wall portion 53 intersects with (strictly speaking, is substantially orthogonal to) both the upper wall portion 51 and the lower wall portion 52 and connects the upper wall portion 51 and the lower wall portion 52. More specifically, the front wall portion 53 interconnects the respective front ends of the upper wall portion 51 and the lower wall portion 52 as illustrated in FIGS. 12 and 13. In a state where the pillar guide G is attached to the connecting frame 50, the front wall portion 53 is positioned ahead of the pillar guide G as illustrated in FIG. 8.

A protruding part 58 is provided at the part of the front wall portion 53 that faces the pillar guide G. The protruding part 58 is a convex button-shaped projection protruding rearward toward the pillar guide G. Incidentally, as illustrated in FIG. 13, the protruding part 58 is configured by a part of a substantially middle part of the front wall portion 53 in the down direction being raised toward the pillar guide G.

As illustrated in FIGS. 10 and 11, the front wall portion 53 is provided with two protruding parts 58 at positions separated from each other in the seat width direction. Hereinafter, one of the protruding parts 58 will be referred to as a first protruding part 58a and the other protruding part 58 will be referred to as a second protruding part 58b.

The rear end of each protruding part 58 (protruding side distal end) is positioned in front of the respective rear ends of the upper wall portion 51 and the lower wall portion 52 as illustrated in FIGS. 8 and 12. The rear end of each protruding part 58 is positioned in front of the burred edge portions 56 and 57 in each of the upper wall portion 51 and the lower wall portion 52.

As described above, the connecting frame 50 is provided with the protruding part 58 protruding toward the pillar guide G. As a result, when the pillar guide G tries to move in the front to back direction, the protruding part 58 restricts the movement of the pillar guide G. As a result, rattling of the pillar guide G is suppressed.

The connecting frame 50 is provided with a plurality of reinforcement portions for the purpose of reinforcement. One of the reinforcement portions (hereinafter, first reinforcement portion 61) is provided at the boundary part between the upper wall portion 51 and the front wall portion 53 (that is, in an upper corner portion) as illustrated in FIGS. 7, 10, and 13. The first reinforcement portion 61 is formed by the boundary part between the upper wall portion 51 and the front wall portion 53 being dented in part. Specifically, the first reinforcement portion 61 is formed by a point of the boundary part positioned close to the middle portion in the seat width direction being dented in a substantially circular arc shape.

As illustrated in FIG. 7, a pair of the first reinforcement portions 61 are provided at bilaterally symmetrical positions with the middle of the connecting frame 50 in the seat width direction (that is, the middle of the seat back frame F1 in the seat width direction) as a boundary. Each of the pair of first reinforcement portions 61 is positioned between the first protruding part 58*a* and the second protruding part 58*b* in the seat width direction as illustrated in FIGS. 7 and 10.

As illustrated in FIGS. 7, 9, and 13, a second reinforcement portion (hereinafter, second reinforcement portion 62) is provided at the boundary part between the lower wall portion 52 and the front wall portion 53 (that is, in a lower corner portion). The second reinforcement portion 62 is formed by the boundary part between the lower wall portion 52 and the front wall portion 53 being dented in part. Specifically, the second reinforcement portion 62 is formed by a point of the boundary part positioned close to the middle portion in the seat width direction being dented in a substantially circular arc shape.

As illustrated in FIGS. 7 and 9, a pair of the second reinforcement portions 62 are provided at bilaterally symmetrical positions with the middle of the connecting frame 50 in the seat width direction as a boundary. Each of the pair of second reinforcement portions 62 is positioned between the first protruding part 58*a* and the second protruding part 58*b* in the seat width direction as illustrated in FIGS. 7 and 9.

The range in which the second reinforcement portion 62 is provided overlaps the range in which the first reinforcement portion 61 is provided in the seat width direction. In other words, each first reinforcement portion 61 and each second reinforcement portion 62 are provided at substantially the same position in the seat width direction as illustrated in FIG. 7.

A third reinforcement portion (hereinafter, third reinforcement portion 63) is provided at a corner part of the upward bent portion 51*a* as illustrated in FIGS. 9 to 11. The third reinforcement portion 63 is formed by the corner part of the upward bent portion 51*a* being dented in part. Specifically, the third reinforcement portion 63 is formed by a point of the corner part of the upward bent portion 51*a* slightly away from the middle in the seat width direction being dented in a substantially circular shape.

As illustrated in FIGS. 10 and 11, a pair of the third reinforcement portions 63 are provided at bilaterally symmetrical positions with the middle of the connecting frame 50 in the seat width direction as a boundary. Each of the pair of third reinforcement portions 63 is positioned between the first protruding part 58*a* and the second protruding part 58*b* in the seat width direction as illustrated in FIGS. 10 and 11. Each of the pair of third reinforcement portions 63 is positioned outside the first reinforcement portion 61 and the second reinforcement portion 62 in the seat width direction as illustrated in FIGS. 10 and 11.

A fourth reinforcement portion (hereinafter, fourth reinforcement portion 64) is provided at a corner part of the downward bent portion 52*a* as illustrated in FIGS. 9 to 11. The fourth reinforcement portion 64 is formed by the corner part of the downward bent portion 52*a* being dented in part. Specifically, the fourth reinforcement portion 64 is formed by a point of the corner part of the downward bent portion 52*a* slightly away from the middle in the seat width direction being dented in a substantially circular shape.

As illustrated in FIGS. 10 and 11, a pair of the fourth reinforcement portions 64 are provided at bilaterally symmetrical positions with the middle of the connecting frame 50 in the seat width direction as a boundary. Each of the pair of fourth reinforcement portions 64 is positioned between the first protruding part 58*a* and the second protruding part 58*b* and positioned outside the first reinforcement portion 61 and the second reinforcement portion 62 in the seat width direction as illustrated in FIGS. 10 and 11.

The range in which the fourth reinforcement portion 64 is provided overlaps the range in which the third reinforcement portion 63 is provided in the seat width direction. In other words, each third reinforcement portion 63 and each fourth reinforcement portion 64 are provided at substantially the same position in the seat width direction as illustrated in FIGS. 10 and 11.

Second Embodiment of Reference Example

Figure 14:
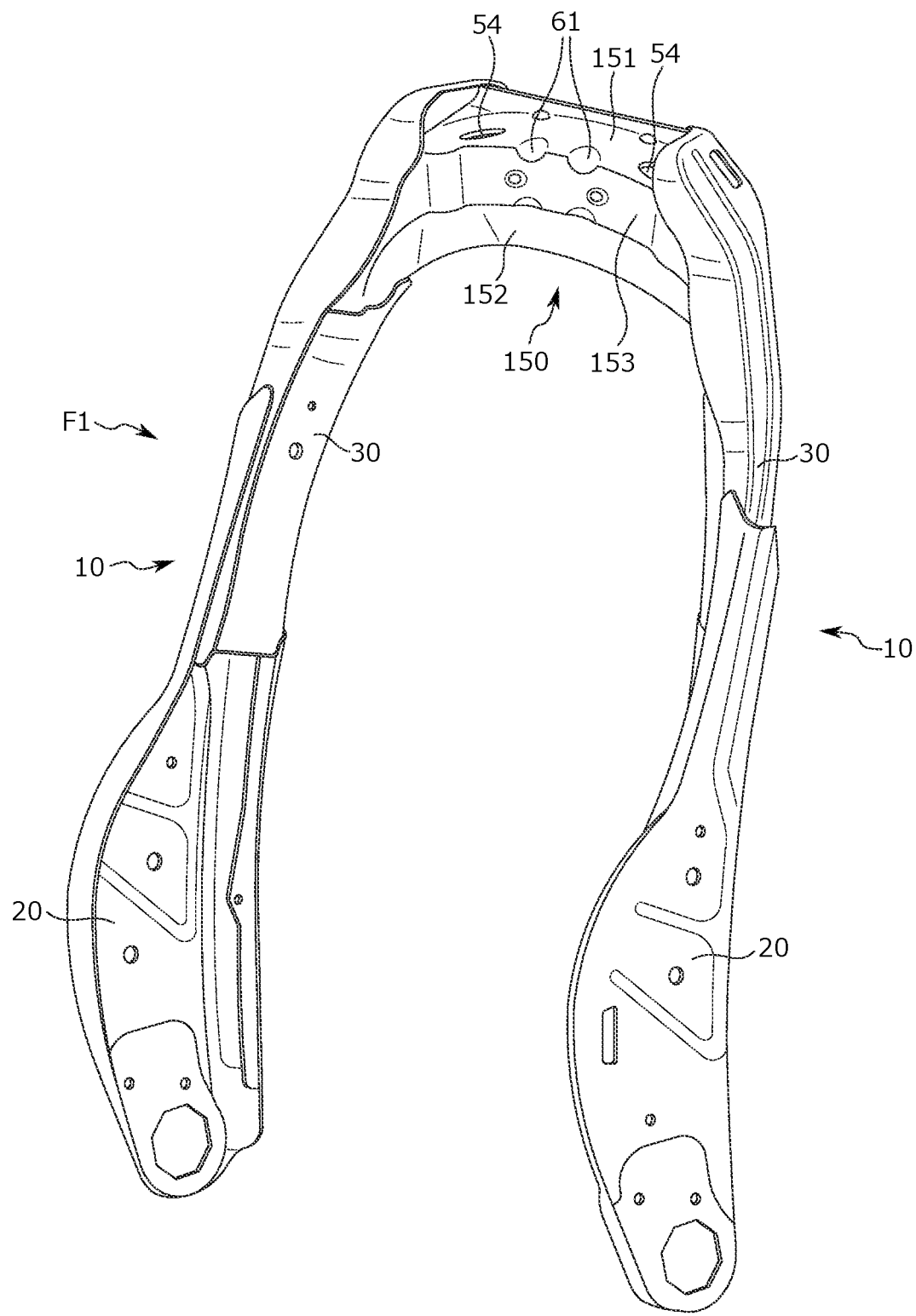
FIG. 14 is a diagram illustrating a seat back frame according to a second embodiment of the reference example.

In the seat back frame F1 according to the first embodiment of the reference example, the connecting frame 50 extends substantially straight along the seat width direction as illustrated in FIGS. 9 to 11. However, the present invention is not limited thereto. Also conceivable is an embodiment (hereinafter, the second embodiment) in which a connecting frame 150 shaped as illustrated in FIG. 14 is provided. FIG. 14 is a diagram illustrating the seat back frame F1 according to the second embodiment of the reference example. Incidentally, in FIG. 14, the pillar guide G is omitted for convenience of illustration. In addition, devices constituting the seat back frame F1 illustrated in FIG. 14 and common to the first embodiment are denoted by the same reference numerals as in the first embodiment (specifically, the reference numerals used in FIGS. 7 to 13).

Hereinafter, the configuration of the second embodiment different from the configuration of the first embodiment (specifically, the configuration of the connecting frame 150) will be described with reference to FIG. 14. In the second embodiment, the connecting frame 150 is curved so as to be positioned downward as the connecting frame 150 heads outward in the seat width direction. In other words, a front wall portion 153 (corresponding to the third part) of the connecting frame 150 is curved in a substantially inverted U shape in front view. Also curved are an upper wall portion 151 (corresponding to the first part) and a lower wall portion 152 (corresponding to the second part) of the connecting frame 150.

In the above configuration of the second embodiment of the reference example, the connecting frame 150 is curved in a substantially inverted U shape, and thus the connecting frame 150 is higher in rigidity than the connecting frame 50 according to the first embodiment.

Third Embodiment of Reference Example

Figure 15:
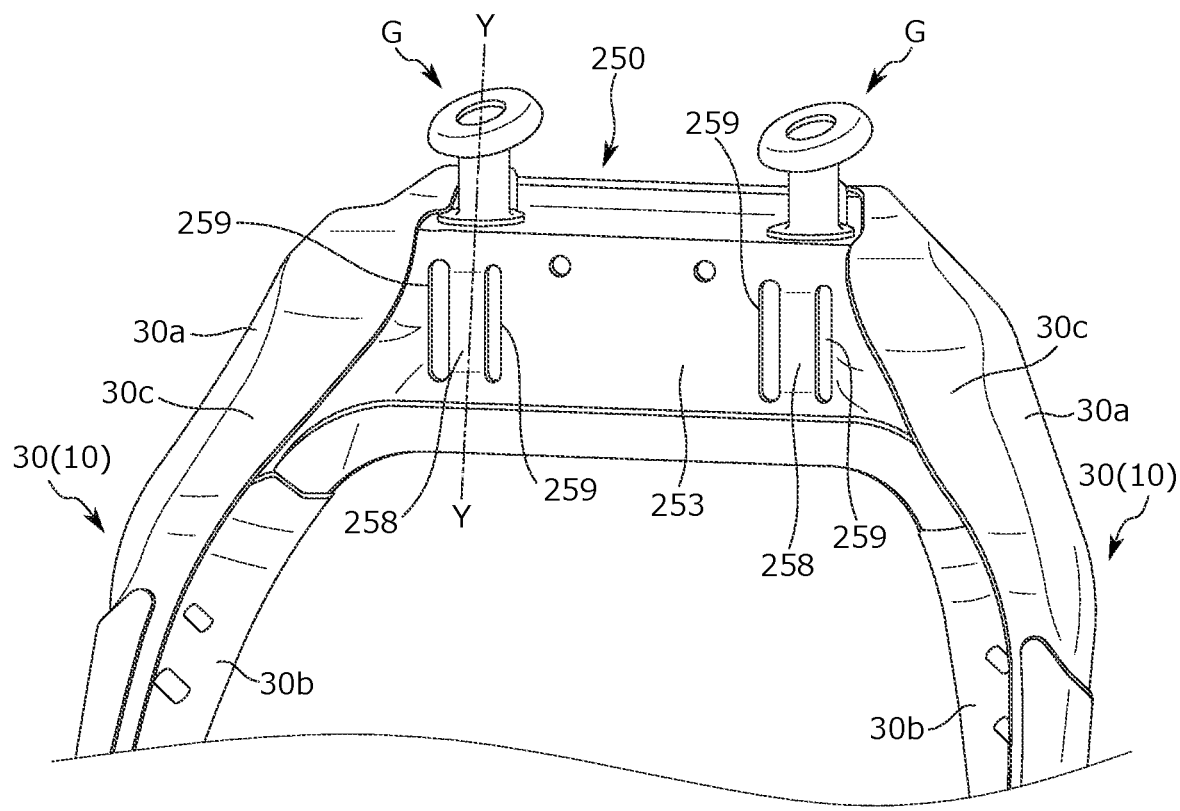
FIG. 15 is a diagram illustrating a connecting member according to a third embodiment of the reference example.
Figure 16:
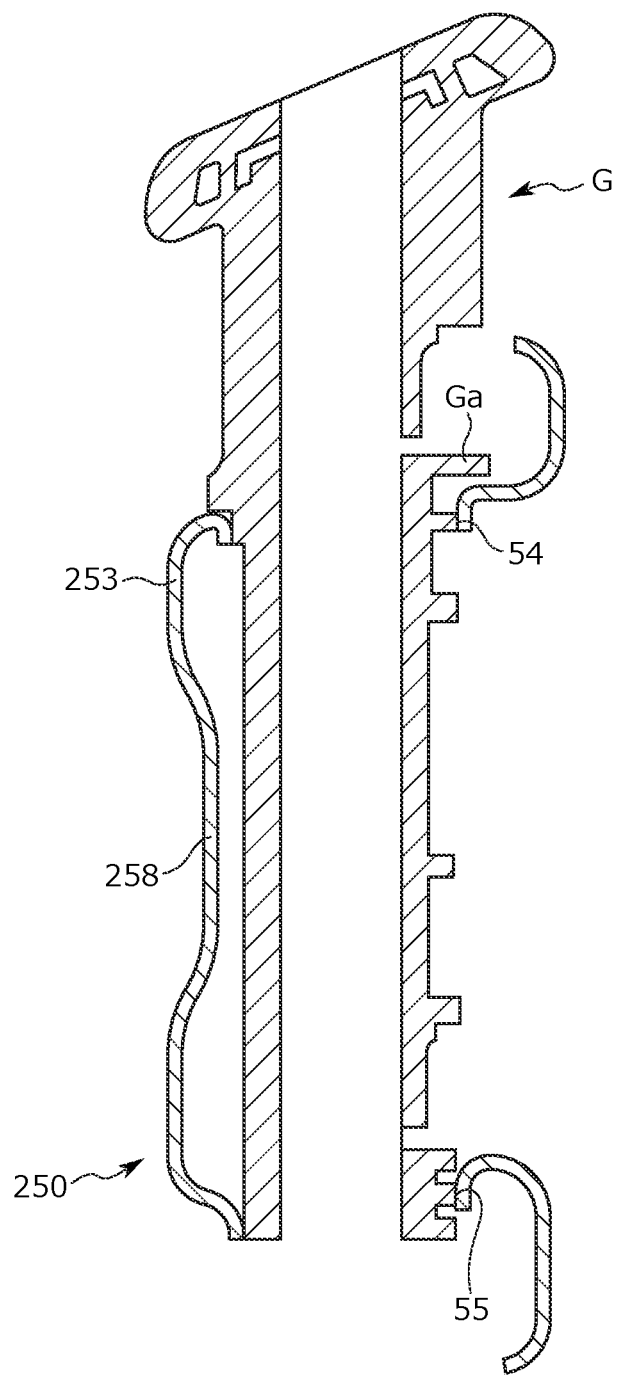
FIG. 16 is a diagram illustrating the Y-Y cross section in FIG. 15.

In the connecting frame 50 according to the first embodiment of the reference example, the protruding part 58 raised in a convex button shape is formed as illustrated in FIGS. 8 and 12. However, the present invention is not limited thereto. Also conceivable is an embodiment (hereinafter, the third embodiment) in which a protruding part 258 shaped as illustrated in FIGS. 15 and 16 is formed on a front wall portion 253 (corresponding to the third part). FIG. 15 is a diagram illustrating the upper end portion of the seat back frame F1 according to the third embodiment of the reference example. FIG. 16 is a diagram illustrating the Y-Y cross section in FIG. 15. Incidentally, devices constituting the seat back frame F1 illustrated in FIGS. 15 and 16 and common to the first embodiment are denoted by the same reference numerals as in the first embodiment (specifically, the reference numerals used in FIGS. 7 to 13).

Hereinafter, the configuration of the third embodiment different from the configuration of the first embodiment (specifically, the configuration of the protruding part 258 and the periphery of the protruding part 258) will be described with reference to FIGS. 15 and 16. In the third embodiment, the part of the front wall portion 253 of a connecting frame 250 that faces the pillar guide G protrudes rearward and constitutes the protruding part 258. The protruding part 258 is a step-shaped projection formed so as to be relatively long along the up to down direction as illustrated in FIG. 16. Incidentally, in the third embodiment, a pair of the protruding parts 258 are provided at positions different from each other in the seat width direction as in the first embodiment.

As illustrated in FIG. 15, a through hole 259 substantially rectangular in front view is provided at the part of the front wall portion 253 positioned around each protruding part 258 (strictly speaking, the part adjacent to each protruding part 258 in the seat width direction). More specifically, the through holes 259 are provided on both sides of the protruding part 258. In other words, each protruding part 258 is provided at a position sandwiched between the through holes 259 in the seat width direction. By the through hole 259 being provided, the protruding part 258 is easily provided around the through hole 259. In addition, by the through hole 259 being provided, an adjustment margin for the amount of protrusion of the protruding part 258 is ensured and the amount of protrusion can be easily adjusted as a result.

As described above, the conveyance seat according to the reference example is a conveyance seat provided with a seat back having a seat back frame and a headrest disposed above the seat back, the seat back frame has side frames provided in both side portions of the seat back frame, a plate-shaped connecting member interconnecting the side frames, and a holding member provided on the connecting member so that the headrest is held, and the connecting member has a first part to which the holding member is attached in a state of intersecting with the holding member, a second part positioned below the first part, the holding member being attached to the second part in a state of intersecting with the holding member, a third part intersecting with both the first part and the second part and connecting the first part and the second part, and a protruding part provided at a part facing the holding member at the third part and protruding toward the holding member.

With the above configuration, it is possible to restrict a movement of the holding member attached to the connecting member and suppress rattling of the holding member.

In the reference example, the protruding part is configured by a part of the third part being raised toward the holding member. By the protruding part being provided by a part of the third part being raised as described above, it is also possible to improve the rigidity of the third part itself.

In the reference example, a through hole is provided at a part positioned around the protruding part at the third part. As a result, the protruding part can be easily provided and the amount of protrusion of the protruding part can be easily adjusted.

In the reference example, the third part connects the front end of the first part and the front end of the second part and is positioned in front of the holding member, the protruding part protrudes rearward, and the rear end of the protruding part is positioned in front of the rear end of the first part and the rear end of the second part. In other words, the protruding part is fitted between the front end and the rear end of each of the first part and the second part. As a result, it is possible to suppress an increase in seat size attributable to the formation of the protruding part.

In the reference example, the first part and the second part are provided with insertion holes formed so that the holding member is attached, the holding member is inserted in the respective insertion holes of the first part and the second part, an edge portion around the insertion hole at each of the first part and the second part is folded downward (strictly speaking, burred), the protruding part protrudes rearward, and the rear end of the protruding part is positioned in front of the edge portion of each of the first and second parts. As a result, it is possible to enhance the rigidity of each of the first part and the second part and suppress an increase in seat size by the protruding part being provided in front of the edge portion.

In the reference example, the protruding part has a first protruding part and a second protruding part separated from each other in the seat width direction. The boundary part between the first part and the third part is provided with a reinforcement portion formed by the boundary part being dented in part. The reinforcement portion is positioned between the first protruding part and the second protruding part in the seat width direction. Here, the reinforcement portion is formed by being dented in the same direction as the first protruding part and the second protruding part. As a result, it is possible to obtain a reinforcement portion-based reinforcement effect while suppressing an increase in seat size attributable to reinforcement portion installation.

In the reference example, the reinforcement portion is a first reinforcement portion and the boundary part between the second part and the third part is provided with a second reinforcement portion formed by the boundary part being dented in part. In the seat width direction, the range in which the first reinforcement portion is provided and the range in which the second reinforcement portion is provided overlap each other. In other words, the first reinforcement portion and the second reinforcement portion are at the same position or substantially the same position in the seat width direction. As a result, it is possible to obtain a reinforcement effect based on each reinforcement portion while suppressing an increase in seat size attributable to the installation of each of the reinforcement portions (first and second reinforcement portions).

In the reference example, the rear end portion of the first part forms an upward bent portion bent upward and the upward bent portion is provided with a third reinforcement portion formed by a corner part of the upward bent portion being dented in part. The third reinforcement portion is positioned outside the first reinforcement portion and the second reinforcement portion and is positioned between the first protruding part and the second protruding part in the seat width direction. With such a positional relationship, it is possible to obtain a reinforcement effect based on the third reinforcement portion while suppressing an increase in seat size attributable to the installation of the third reinforcement portion.

In the reference example, the rear end portion of the second part forms a downward bent portion bent downward and the downward bent portion is provided with a fourth reinforcement portion formed by a corner part of the downward bent portion being dented in part. In the seat width direction, the range in which the third reinforcement portion is provided and the range in which the fourth reinforcement portion is provided overlap each other. In other words, the fourth reinforcement portion is at the same position or substantially the same position as the third reinforcement portion in the seat width direction. As a result, it is possible to obtain a reinforcement effect based on the fourth reinforcement portion while suppressing an increase in seat size attributable to the installation of the fourth reinforcement portion.

In the reference example, the third part is curved so as to be positioned downward toward the outside in the seat width direction (that is, curved in an inverted U shape in front view). As a result, it is possible to improve the rigidity of the connecting member including the third part.

REFERENCE SIGNS LIST

10: SIDE FRAME (FIRST SIDE FRAME, SECOND SIDE FRAME)
20: FIRST SIDE FRAME PIECE
21: FIRST SIDE FRAME PIECE LOWER PORTION
   21a: SIDE WALL
   21b: REAR WALL
   21c: FRONT WALL
22: FIRST SIDE FRAME PIECE UPPER PORTION
   22a: SIDE WALL
   22a1: FIRST OUTER SIDE WALL
   22a2: SECOND OUTER SIDE WALL
   22b: REAR WALL (SECOND END PORTION)
   22c: FRONT WALL (FIRST END PORTION)
   22d: CORNER PORTION
   22h: REINFORCEMENT BEAD (RAISED REGION)
30: SECOND SIDE FRAME PIECE
   30a: SIDE WALL
   30b: REAR WALL
   30c: FRONT WALL
31: SECOND SIDE FRAME PIECE LOWER PORTION
   31a: SIDE WALL
   31a1: FIRST INNER SIDE WALL
   31a2: SECOND INNER SIDE WALL
   31b: REAR WALL (SECOND END PORTION)
   31c: FRONT WALL (FIRST END PORTION)
   31d: BENT PORTION
   31e: REAR FLANGE PORTION
   31f: FRONT FLANGE PORTION (FLANGE PORTION)
32: SECOND SIDE FRAME PIECE UPPER PORTION
   32a: SIDE WALL
   32b: REAR WALL
   32c: FRONT WALL
   32h: REINFORCEMENT BEAD
40: OVERLAPPING PART
41: FIRST CLOSED REGION (FRONT FIRST SURROUNDED REGION)
42: SECOND CLOSED REGION (REAR SECOND SURROUNDED REGION)
50: CONNECTING FRAME
51: UPPER WALL PORTION
   51a: UPWARD BENT PORTION
52: LOWER WALL PORTION
   52a: DOWNWARD BENT PORTION
53: FRONT WALL PORTION
54: INSERTION HOLE
55: INSERTION HOLE
56: EDGE PORTION
57: EDGE PORTION
58: PROTRUDING PART
   58a: FIRST PROTRUDING PART
   58b: SECOND PROTRUDING PART
60: FRAME OVERLAPPING PART
61: FIRST REINFORCEMENT PORTION
62: SECOND REINFORCEMENT PORTION
63: THIRD REINFORCEMENT PORTION
64: FOURTH REINFORCEMENT PORTION
110: SIDE FRAME
120: FIRST SIDE FRAME PIECE
130: SECOND SIDE FRAME PIECE
150: CONNECTING FRAME
151: UPPER WALL PORTION
152: LOWER WALL PORTION
153: FRONT WALL PORTION
250: CONNECTING FRAME
253: FRONT WALL PORTION
258: PROTRUDING PART
259: THROUGH HOLE
F1: SEAT BACK FRAME (FRAME)
F2: SEAT CUSHION FRAME (FRAME)
G: PILLAR GUIDE
   Ga: FLANGE PORTION
hp: HEADREST PILLAR
S: VEHICLE SEAT (CONVEYANCE SEAT)
   S1: SEAT BACK
   S2: SEAT CUSHION
   S3: HEADREST
T1: FIRST CLOSED REGION
T2: SECOND CLOSED REGION
X1: CROSS SECTION
X2: CROSS SECTION

The invention claimed is:

1. A method of manufacturing a conveyance seat, comprising:
preparing a pad material and a frame having a first side frame piece and a second side frame piece which constitute a side frame of the conveyance seat,
overlapping the first side frame piece and the second side frame piece with each other so that a front first surrounded region and a rear second surrounded region respectively surrounded by the first side frame piece and the second side frame piece are formed in a cross section intersecting with a direction of extension of the side frame, wherein
the second side frame piece includes a first inner side wall positioned on an inner side of the front first surrounded region in a width direction of the conveyance seat and a second inner side wall positioned on an inner side of the rear second surrounded region in the width direction of the conveyance seat,
the first inner side wall is positioned outside the second inner side wall in the width direction of the conveyance seat,
the rear second surrounded region is formed in a region wider than the front first surrounded region,
each of the first side frame piece and the second side frame piece has a first end portion and a second end portion in a direction intersecting each of the direction of extension and the width direction of the conveyance seat,
the first end portion of the first side frame piece and the first end portion of the second side frame piece overlap, and the first end portion of the first side frame piece is positioned in front of the first end portion of the second side frame piece, and
the second end portion of the first side frame piece and the second end portion of the second side frame piece overlap, and the second end portion of the first side frame piece is positioned behind the second end portion of the second side frame piece,
the first end portion of the first side frame piece and the first end portion of the second side frame piece extend towards a middle of the frame from the front first surrounded region in the width direction, and
the second end portion of the first side frame piece and the second end portion of the second side frame piece extend towards the middle of the frame from the rear second surrounded region in the width direction.

2. The method of manufacturing the conveyance seat according to claim 1, wherein
the rear second surrounded region is positioned inside the front first surrounded region in the width direction of the conveyance seat.

3. The method of manufacturing the conveyance seat according to claim 1, wherein
the frame includes:
the side frame which is a first side frame,
a second side frame separated from the first side frame in the width direction of the conveyance seat, and
a connecting frame interconnecting the first side frame and the second side frame in the width direction.

4. The method of manufacturing the conveyance seat according to claim 1, wherein
a front flange portion of the second side frame piece extends towards the second end portion of the second side frame piece in a front to back direction of the conveyance seat.

5. The method of manufacturing the conveyance seat according to claim 1, wherein
the front first surrounded region and the rear second surrounded region are aligned in the direction intersecting each of the direction of extension of the side frame and the width direction of the conveyance seat,
the first side frame piece includes a first outer side wall positioned on an outer side of the front first surrounded region in the width direction of the conveyance seat and a second outer side wall positioned on an outer side of the rear second surrounded region in the width direction of the conveyance seat, and
the first outer side wall and the second outer side wall are aligned with each other in the direction intersecting each of the direction of extension of the side frame and the width direction of the conveyance seat.

6. The method of manufacturing the conveyance seat according to claim 1, wherein
the front first surrounded region is arranged to be positioned in a front to back direction of the conveyance seat with respect to the rear second surrounded region, and
the front first surrounded region is disposed within a width of the rear second surrounded region in the width direction of the conveyance seat.

7. The method of manufacturing the conveyance seat according to claim 1, wherein
the conveyance seat comprises an overlapping part where the second side frame piece overlaps the first side frame piece in a state where the second side frame piece is disposed closer to the middle of the frame than the first side frame piece in the width direction of the conveyance seat, and
the first side frame piece is provided to overlap the second side frame piece in a portion positioned between the front first surrounded region and the rear second surrounded region in the cross section of the overlapping part.

8. The method of manufacturing the conveyance seat according to claim 1, wherein
the first end portion of the first side frame piece and the first end portion of the second side frame piece extend apart from each other to form an edge of the front first surrounded region,
the second end portion of the first side frame piece and the second end portion of the second side frame piece extend apart from each other to form an edge of the rear second surrounded region, and
an edge of the second end portion of the second side frame piece is provided with a rear flange portion extending toward the first end portion of the second side frame piece in a front to back direction of the conveyance seat.

9. The method of manufacturing the conveyance seat according to claim 1, wherein
the frame includes:
the side frame which is a first side frame,
a second side frame separated from the first side frame in the width direction of the conveyance seat, and
a connecting frame interconnecting the first side frame and the second side frame in the width direction,
the connecting frame partially overlaps one of the first side frame piece and the second side frame piece of the first side frame in the width direction, and
the connecting frame overlaps both a front wall and a rear wall of the one of the first side frame piece and the second side frame piece of the first side frame.

10. The method of manufacturing the conveyance seat according to claim 1, wherein
the conveyance seat has a seat back, a seat cushion, a headrest and the frame disposed in the conveyance seat,
the frame includes a seat back frame disposed in the seat back,
the seat back includes the pad material disposed in front of the seat back frame, the pad material is covered with a skin material, and
the seat back frame includes:
the side frame which is a first side frame,
a second side frame separated from the first side frame in the width direction of the conveyance seat, and
a connecting frame interconnecting the first side frame and the second side frame in the width direction.

* * * * *